United States Patent
Callender et al.

(10) Patent No.: US 10,057,757 B2
(45) Date of Patent: Aug. 21, 2018

(54) MEASUREMENT OF DEACTIVATED SECONDARY COMPONENT CARRIERS

(71) Applicant: Telefonaktiebolaget L M Ericsson (publ), Stockholm (SE)

(72) Inventors: Christopher Callender, Kinross (GB); Joakim Axmon, Kävlinge (SE); Muhammad Kazmi, Bromma (SE); Walter Müller, Upplands Väsby (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 308 days.

(21) Appl. No.: 14/703,595

(22) Filed: May 4, 2015

(65) Prior Publication Data

US 2015/0327054 A1    Nov. 12, 2015

Related U.S. Application Data

(60) Provisional application No. 61/991,019, filed on May 9, 2014.

(51) Int. Cl.
*H04L 5/00* (2006.01)
*H04W 24/10* (2009.01)
(Continued)

(52) U.S. Cl.
CPC ............ *H04W 8/183* (2013.01); *H04L 5/001* (2013.01); *H04W 24/10* (2013.01); *H04W 72/0453* (2013.01)

(58) Field of Classification Search
CPC . H04W 8/183; H04W 24/10; H04W 72/0453; H04L 5/001
(Continued)

(56) References Cited

U.S. PATENT DOCUMENTS

| 2011/0199908 A1* | 8/2011 | Dalsgaard ............. H04W 24/10 370/241 |
| 2014/0341192 A1 | 11/2014 | Venkob et al. |

FOREIGN PATENT DOCUMENTS

| WO | 2011090319 A2 | 7/2011 | |
| WO | WO 2011090319 A2 * | 7/2011 | ............. H04L 5/001 |
| WO | 2013172769 A1 | 11/2013 | |

OTHER PUBLICATIONS

NTT DOCOMO, "Way forward on Glitch issues due to SCell bandwidth retuning", Nov. 9, 2010, 3GPP TSG-RAN WG4 meeting #57 DRAFT R4-104046, pp. 1-5.*

(Continued)

*Primary Examiner* — Jung Park
*Assistant Examiner* — M Mostazir Rahman
(74) *Attorney, Agent, or Firm* — Withrow & Terranova, PLLC

(57) ABSTRACT

Systems and methods relating to reconfiguration of a Carrier Aggregation (CA) enabled wireless device using a measurement gap are disclosed. In some embodiments, a method of operation of a CA enabled wireless device in a cellular communications network comprises reconfiguring the wireless device during a measurement gap such that the wireless device is enabled to receive a first set of one or more carriers after the measurement gap that are different than a second set of one or more carriers that the wireless device was receiving before the measurement gap. In some embodiments, the reconfiguration of the wireless device during the measurement gap enables reconfiguration of the wireless device for measurements on a Secondary Component Carrier (SCC) of a configured and deactivated Secondary Cell (SCell) of the wireless device without serving cell interruption.

15 Claims, 14 Drawing Sheets

(51) Int. Cl.
*H04W 8/18* (2009.01)
*H04W 72/04* (2009.01)

(58) Field of Classification Search
USPC .......................................................... 370/329
See application file for complete search history.

(56) References Cited

OTHER PUBLICATIONS

Samsung, "Discussion on RF retuning", Oct. 11-15, 2010, 3GPP TSG-RAN4 AH#4 R4-103838, pp. 1-2.*

Ericsson, "R4-141366: Packet loss rate due to measurements with deactivated SCell," 3rd Generation Partnership Project (3GPP), TSG-RAN WG4 Meeting #70bis, Mar. 31-Apr. 4, 2014, 3 pages, San Jose Del Cabo, Mexico.

Ericsson, "R4-142712: Serving Cell Interruption due to Measurements without Gaps," 3rd Generation Partnership Project (3GPP), TSG-RAN WG4 Meeting #71, May 19-23, 2014, 3 pages, Seoul, South Korea.

Huawei et al., "R4-130266: Further discussion on UE interruption requirements in SCC RSTD measurements with de-activated SCell," 3rd Generation Partnership Project (3GPP), TSG-RAN WG4 Meeting #66, Jan. 28-Feb. 1, 2013, 8 pages, Malta.

NTT DOCOMO, "R4-104046: Way forward on Glitch issues due to SCell bandwidth retuning," 3rd Generation Partnership Project (3GPP), TSG-RAN WG4 meeting #57, Nov. 15-19, 2010, 5 pages, Jacksonville, FL.

NTT DOCOMO et al., "R4-141131: Way forward on handling of interruption for single chip RF-IC implementation," 3rd Generation Partnership Project (3GPP), 3GPP RAN4 Meeting #70, Date Unknown, 2 pages, Prague, Czech Republic.

NTT DOCOMO et al., "R4-142342: WF on Small gap," 3rd Generation Partnership Project (3GPP), 3GPP RAN4 Meeting #70bis, Date Unknown, 2 pages, San Jose Del Cabo, Mexico.

NTT DOCOMO, "R4-141889: Proposal on small gaps," 3rd Generation Partnership Project (3GPP), TSG-RAN WG4 Meeting #70bis, Mar. 31-Apr. 4, 2014, 4 pages, San Jose Del Cabo, Mexico.

Qualcomm Incorporated, "R4-135075: Inter-frequency Measurements Without Gaps," 3rd Generation Partnership Project (3GPP), TSG-RAN WG4 Meeting #68Bis, Oct. 7-11, 2013, 2 pages, Riga, Latvia.

Samsung, "R4-103838: Discussion on RF retuning," 3rd Generation Partnership Project (3GPP), TSG-RAN4 AH#4, Oct. 11-15, 2010, 2 pages, Xian, China.

International Search Report and Written Opinion for International Patent Application No. PCT/IB2015/053356, dated Oct. 29, 2015, 17 pages.

* cited by examiner

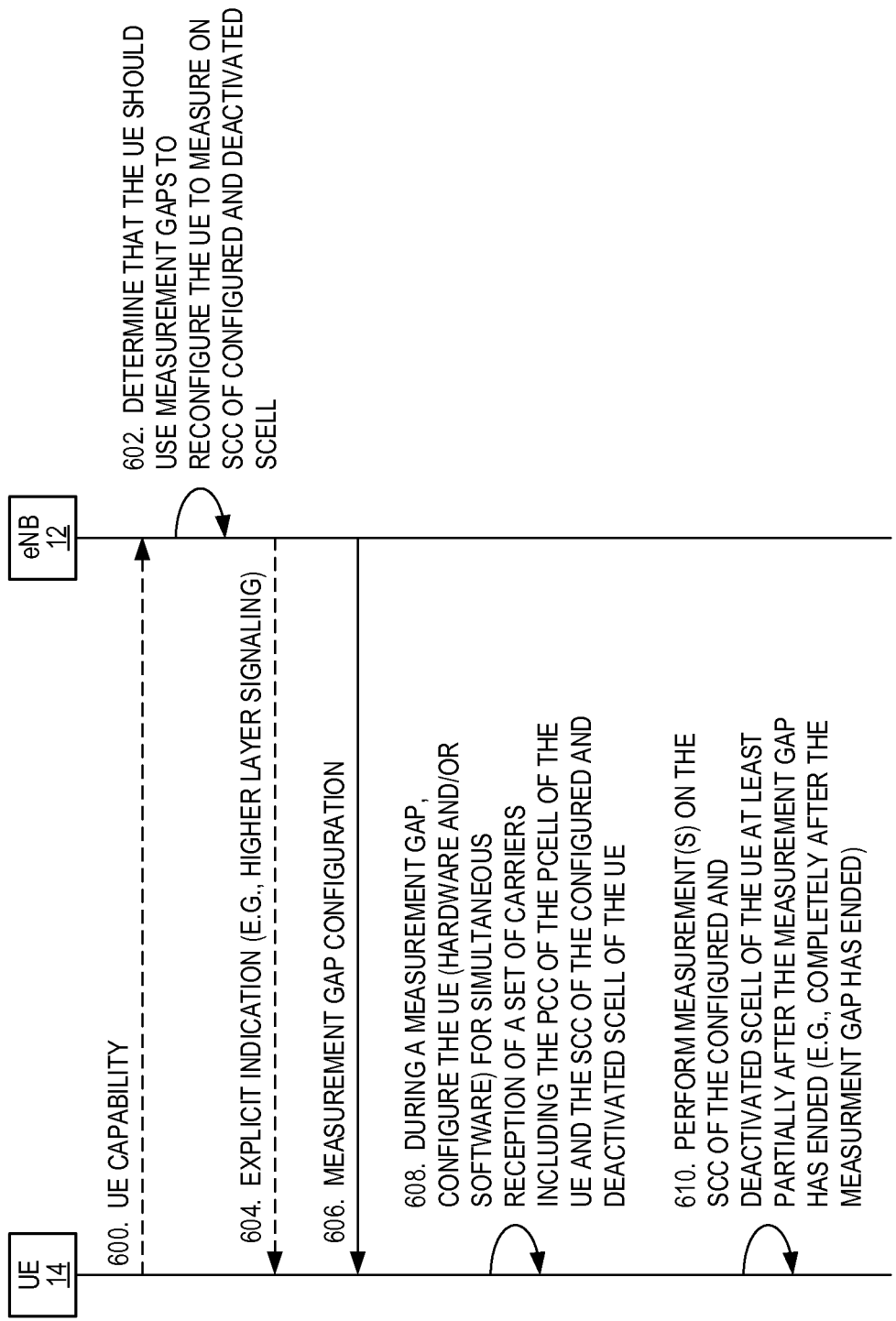

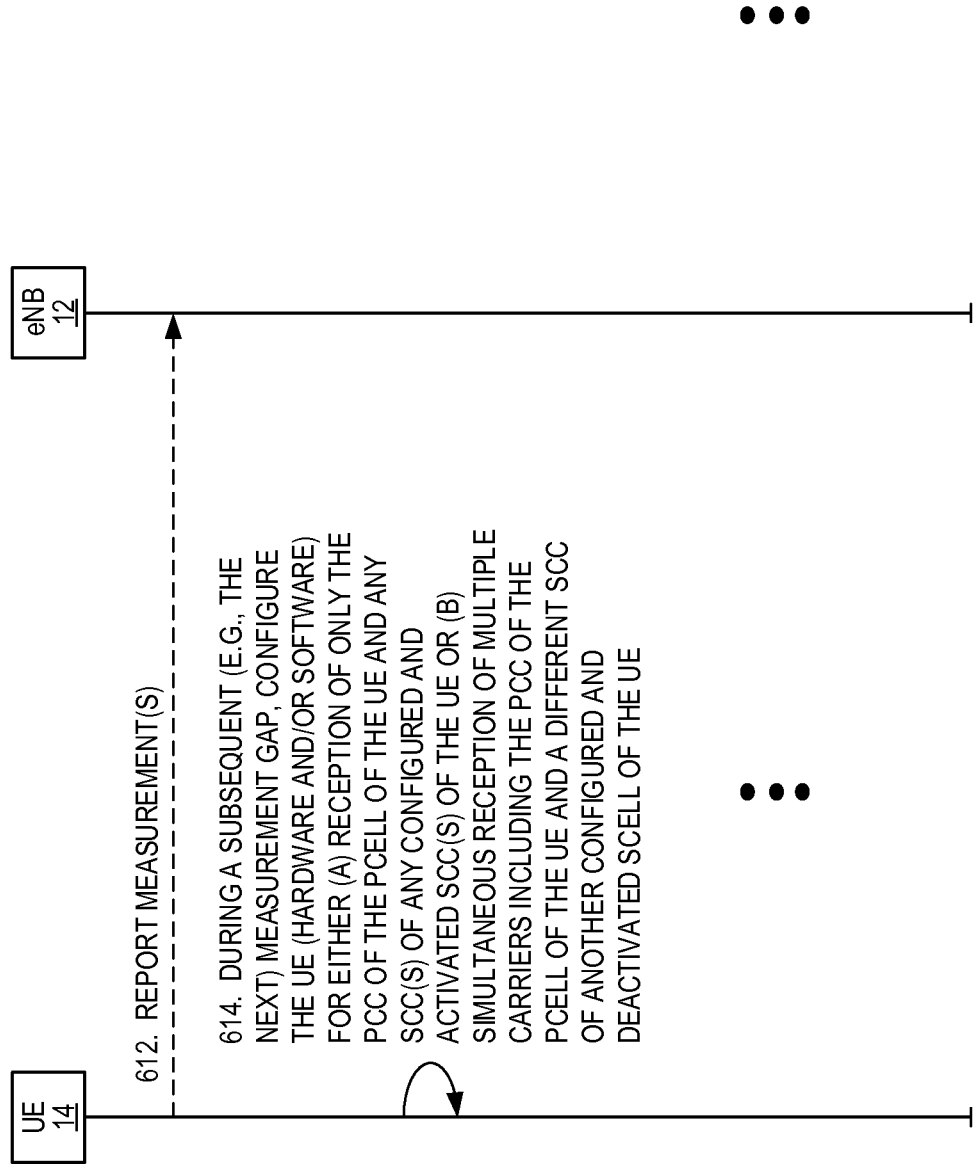

MEASUREMENT OF DEACTIVATED SECONDARY COMPONENT CARRIERS

RELATED APPLICATIONS

This application claims the benefit of provisional patent application Ser. No. 61/991,019, filed May 9, 2014, the disclosure of which is hereby incorporated herein by reference in its entirety.

TECHNICAL FIELD

This disclosure pertains to measuring deactivated secondary component carriers and, in particular, to measuring deactivated secondary component carriers without interruptions.

BACKGROUND

Starting with Release 10, Third Generation Partnership Project (3GPP) Long Term Evolution (LTE) networks support Carrier Aggregation (CA). CA is where multiple Component Carriers (CCs) are aggregated and used for uplink/downlink transmission. There are basically two types of CA, namely, intra-band CA where the CCs are in the same frequency band and inter-band CA where the CCs are in different frequency bands. For intra-band CA, the CCs may be contiguous (i.e., adjacent in frequency) or non-contiguous (i.e., separated in frequency but still within the same frequency band).

For a particular User Equipment device (UE), one of the CCs used for CA is a Primary Component Carrier (PCC), whereas the other CC(s) is a Secondary Component Carrier(s) (SCC(s)). The serving cell of the UE on the PCC is referred to as the Primary Cell (PCell) of the UE. Conversely, a serving cell of the UE on a SCC is referred to as a Secondary Cell (SCell) of the UE. The PCell is always activated for the UE. In contrast, once a cell is identified as an SCell for the UE, that cell is configured as an SCell for the UE. Once configured, the SCell may be either activated or deactivated. As an example, for downlink CA, the UE receives downlink transmissions from a configured and activated SCell but does not receive downlink transmission from a configured and deactivated SCell.

In a CA scenario where one or more SCell(s) is configured but deactivated, the UE is expected to perform measurements on the corresponding SCC. In 3GPP Release 10, it was specified that UEs should be able to make such measurements without configured measurement gaps, as CA capable UEs (herein referred to as CA capable UEs, CA enabled UEs, or CA UEs) have Radio Frequency (RF) capability to receive multiple carriers simultaneously.

Subsequently, it was identified that even though CA UEs have the capability to receive multiple carriers simultaneously, starting or stopping the reception on an inactive carrier (e.g., to make measurements) may cause interruption to the other active carrier(s) that are being received. Thus, to enable power efficient CA implementation by starting and stopping the SCell reception, interruptions are allowed in some scenarios for 3GPP Release 10, for example when the deactivated SCell measurement cycle is configured to be greater than or equal to some specified value such as 640 milliseconds (ms). Each SCC of the UE may be configured with any one of the pre-defined values of the SCell measurement cycles: 160 ms, 256 ms, 320 ms, 640 ms, and 1280 ms. The exact value is still under discussion, and subject to change. When interruptions are allowed, the maximum allowed packet loss due to the interruptions is specified, for example 0.5% missed ACK/NACK rate.

Typically, interruptions are caused in the UE by retuning the RF local oscillator(s) used for the receiver(s) for the serving cell(s). Such reconfiguration of the RF may be necessary to change the receiver bandwidth (often for intra-band CA) so that the serving frequency and the target frequency to be measured can be received by a single receiver chain. Changing the receiver bandwidth also implies that the center frequency to which the receiver is tuned needs to be changed. Another reason for reconfiguring local oscillators is to reduce the impact of spurious emissions on the UE transmitter from the receiver local oscillators. This typically may be done for inter-band CA using a single chip RF solution. Finally, some interruption may occur due to the local oscillator pulling phenomenon. All of these causes of interruption are strongly related to UE architecture and cannot easily be predicted by the serving enhanced or evolved Node B (eNB).

From a system perspective, the interruptions are undesirable, especially as the serving eNB is unaware of whether a given UE makes interruptions; and if the UE does make interruptions, the serving eNB is unaware of the exact instants and durations when the interruptions occur. So, for example, the eNB may schedule the UE during an interruption, there may be impact to Outer Loop Link Adaptation (OLLA) especially if the Block Error Rate (BLER) target is close to or less than the packet loss rate, and so on.

As such, there is a need for systems and methods for avoiding interruptions on the serving cells of the UE resulting from reconfiguration of the UE for measurements on a SCC of a configured and deactivated SCell of the UE.

SUMMARY

Systems and methods relating to reconfiguration of a Carrier Aggregation (CA) enabled wireless device using a measurement gap are disclosed. In some embodiments, a method of operation of a CA enabled wireless device in a cellular communications network comprises reconfiguring the wireless device during a measurement gap such that the wireless device is enabled to receive a first set of one or more carriers after the measurement gap that are different than a second set of one or more carriers that the wireless device was receiving before the measurement gap. In some embodiments, the reconfiguration of the wireless device during the measurement gap enables reconfiguration of the wireless device for measurements on a Secondary Component Carrier (SCC) of a configured and deactivated Secondary Cell (SCell) of the wireless device without serving cell interruption.

In some embodiments, the method of operation of the wireless device further comprises receiving the second set of one or more carriers before the measurement gap and receiving the first set of one or more carriers after the measurement gap.

In some embodiments, the first set of one or more carriers comprises a Primary Component Carrier (PCC) of a Primary Cell (PCell) of the wireless device and a SCC of a configured and deactivated SCell of the wireless device, and the second set of one or more carriers comprises the PCC of the PCell of the wireless device but not the SCC of the configured and deactivated SCell of the wireless device.

In some embodiments, the second set of one or more carriers comprises a PCC of a PCell of the wireless device and a SCC of a configured and deactivated SCell of the wireless device, and the first set of one or more carriers comprises the PCC of the PCell of the wireless device but not the SCC of the configured and deactivated SCell of the wireless device.

In some embodiments, the method of operation of the wireless device further comprises receiving an indication from the cellular communications network that the wireless device is to use measurement gaps for reconfiguration of the wireless device to receive different sets of carriers after the measurement gaps than the wireless device was receiving before the measurement gaps. In some embodiments, the indication is an explicit indication received via Radio Resource Control (RRC) signaling. In other embodiments, the indication is an implicit indication when measurement gaps are configured at the wireless device. In some embodiments, the indication is an implicit indication when measurement gaps are configured at the wireless device and the wireless device has at least one configured and deactivated SCell on a respective SCC.

In some embodiments, the method of operation of the wireless device further comprises performing non-serving frequency (i.e., inter-frequency) and/or inter-Radio Access Technology (RAT) measurements during the measurement gap.

In some embodiments, reconfiguring the wireless device during the measurement gap comprises reconfiguring the wireless device for one or more non-serving frequency and/or inter-RAT measurements during a time phase T1 of the measurement gap, performing the one or more non-serving frequency and/or inter-RAT measurements during a time phase T2 of the measurement gap, and reconfiguring the wireless device for simultaneous reception of the first set of one or more carriers during a time phase T3 of the measurement gap. Further, in some embodiments, the first set of one or more carriers comprises a PCC of a PCell of the wireless device and a SCC of a configured and deactivated SCell of the wireless device, and the second set of one or more carriers comprises the PCC of the PCell of the wireless device but not the SCC of the configured and deactivated SCell of the wireless device. In other embodiments, the second set of one or more carriers comprises the PCC of the PCell of the wireless device and the SCC of the configured and deactivated SCell of the wireless device, and the first set of one or more carriers comprises the PCC of the PCell of the wireless device but not the SCC of the configured and deactivated SCell of the wireless device.

In some embodiments, reconfiguring the wireless device during the measurement gap comprises reconfiguring the wireless device for simultaneous reception of one or more carriers for non-serving frequency and/or inter-RAT measurements and a SCC of a configured and deactivated SCell of the UE during a time phase T1 of the measurement gap, performing one or more measurements on the one or more carriers for non-serving frequency and/or inter-RAT measurements during a time phase T2 of the measurement gap, starting one or more measurements on the SCC of the configured and deactivated SCell of the UE during the time phase T2 of the measurement gap, and reconfiguring the wireless device for simultaneous reception of the first set of one or more carriers during a time phase T3 of the measurement gap, wherein the first set of one or more carriers does not comprise the one or more carriers for non-serving frequency and/or inter-RAT measurements.

In some embodiments, reconfiguring the wireless device during the measurement gap comprises reconfiguring the wireless device for simultaneous reception of a PCC of the wireless device, a SCC of a configured and deactivated SCell of the wireless device, and an additional SCC of an additional configured and deactivated SCell of the UE during a time phase T1 of the measurement gap, performing one or more measurements on the additional SCC during a time phase T2 of the measurement gap, and reconfiguring the wireless device for simultaneous reception of the first set of one or more carriers during a time phase T3 of the measurement gap.

In some embodiments, reconfiguring the wireless device during the measurement gap comprises, if no non-serving frequency or inter-RAT measurements are to be performed during the measurement gap, reconfiguring the wireless device at any time during the measurement gap.

In some embodiments, the method further comprises not causing interruption on any serving cell when reconfiguring the wireless device Radio Frequency (RF) receiver provided the measurement gaps are configured.

In some embodiments, the method of operation of the wireless device further comprises signaling wireless device capability information to a network node, said capability information indicating that the wireless device is capable of reconfiguring the wireless device during a measurement gap such that the wireless device is enabled to receive a set of one or more carriers after the measurement gap that is different than that which the wireless device was receiving before the measurement gap.

Embodiments of a CA enabled wireless device are also disclosed.

Embodiments of a method of operation of a network node in a cellular communications network are also disclosed. In some embodiments, a method of operation of a network node comprises making a determination as to whether a wireless device should use measurement gaps to reconfigure the wireless device to measure SCCs of configured and deactivated SCells or should autonomously reconfigure the wireless device to measure SCCs of configured and deactivated SCells of the wireless device at a time chosen by the wireless device, and indicating the determination to the wireless device.

In some embodiments, making the determination comprises making the determination based on reported packet loss capabilities of the wireless device. In some embodiments, making the determination comprises making the determination based on one or more services being accessed by the wireless device. In some embodiments, making the determination comprises making the determination based on an estimate of network loading. In some embodiments, making the determination comprises making the determination based on a received wireless device capability information from the wireless device, said capability information indicating that the wireless device is capable of reconfiguring the wireless device during a measurement gap such that the wireless device is enabled to receive a set of one or more carriers after the measurement gap that are different than that which the wireless device was receiving before the measurement gap.

In some embodiments, indicating the determination to the wireless device comprises transmitting an explicit indication of the determination to the wireless device via higher layer signaling. In other embodiments, indicating the determination to the wireless device comprises configuring a measurement gap pattern for the wireless device.

In some embodiments, the determination is that the wireless device should use measurement gaps to reconfigure the wireless device to measure SCCs of configured and deactivated SCells, and the method further comprises determining, for the wireless device, a measurement gap pattern for enabling the wireless device to reconfigure for measurements on one or more SCCs of one or more configured and deactivated SCells of the wireless device without serving cell interruption and indicating the measurement gap pattern to the wireless device. In some embodiments, determining the measurement gap pattern comprises determining the measurement gap pattern based on one or more of a group consisting of: SCell measurement cycle of the one or more configured and deactivated SCells of the wireless device, whether the wireless device is configured to perform non-serving frequency and/or inter-RAT measurements using measurement gaps, and type of non-serving frequency and/or inter-RAT measurements to be performed by the wireless device using measurement gaps.

In some embodiments, the determination is that the wireless device should use measurement gaps to reconfigure the wireless device to measure SCCs of configured and deactivated SCells, and the method further comprises adapting, for the wireless device, an SCell measurement cycle length for one or more SCCs of one or more configured and deactivated SCells of the wireless device based on a measurement gap pattern configured at the wireless device for performing non-serving frequency and/or inter-RAT measurements and indicating the SCell measurement cycle length to the wireless device.

Embodiments of a network node are also disclosed.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

FIGS. 10A and 10B show a diagram that illustrates the operation of a UE and a base station (e.g., an enhanced or evolved Node B (eNB)) according to some embodiments of the present disclosure;

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Embodiments of the present disclosure are directed to making use of measurement gaps as opportunities to reconfigure User Equipment device (UE) operations such that the UE is capable of receiving different carrier(s) after the measurement gap than the ones that the UE was receiving before the measurement gap. In some embodiments, a network node (e.g., an enhanced or evolved Node B (eNB)) can determine whether the UE should be reconfigured accordingly. An indication from the network node to UE as to whether this present approach or a legacy approach should be used by the UE to make deactivated Secondary Component Carrier (SCC) measurements can be either implicit or explicit. In some embodiments, methods in a network node include determining which approach to deactivated Secondary Cell (SCell) measurements the eNB should indicate to a UE (e.g., for explicit indications).

Figure 1:
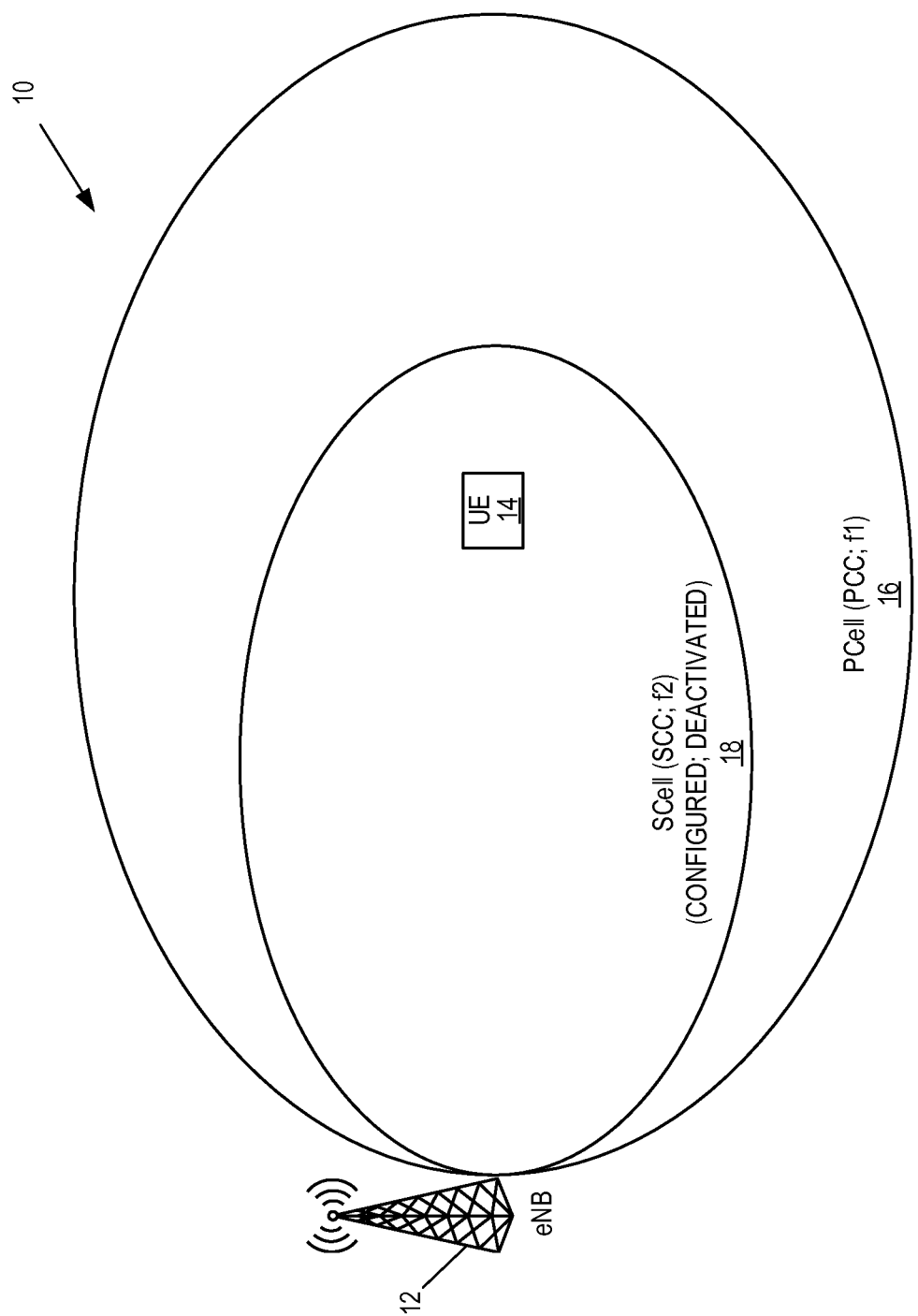
FIG. 1 illustrates one example of a cellular communications network.

Before describing embodiments of the present disclosure, a brief discussion of one example of a cellular communications network 10, as illustrated in FIG. 1, is beneficial. For the discussion herein, the cellular communications network 10 is preferably a Third Generation Partnership Project (3GPP) Long Term Evolution (LTE) network and, as such, 3GPP LTE terminology is oftentimes used. However, the concepts disclosed herein are not limited to 3GPP LTE. Rather, the concepts disclosed herein may be utilized in any type of wireless system that utilizes Carrier Aggregation (CA).

As illustrated, the cellular communications network 10 includes an eNB 12, which may more generally be referred to as a base station. A UE 14 is connected to the cellular communications network 10 and operates to transmit to and receive from the cellular communications network 10. The UE 14 may be more generally referred to herein as a wireless device. The cellular communications network 10, and in particular the eNB 12, supports CA. In this particular example, the eNB 12 controls a cell 16 on a first carrier frequency (f1) and a cell 18 on a second carrier frequency (f2). With respect to CA for the UE 14, the cell 16 is a Primary Cell (PCell) of the UE 14 and, as such, the cell 16 is referred to herein as a PCell 16 of the UE 14, and the carrier of the PCell 16 is referred to herein as a Primary Component Carrier (PCC) for the UE 14. Similarly, the cell 18 is an SCell of the UE 14 and, as such, the cell 18 is referred to herein as an SCell 18 of the UE 14, and the carrier of the SCell 18 is referred to herein as a SCC for the UE 14.

In this example, the SCell 18 is configured and deactivated. As discussed in detail below, the UE 14 utilizes measurement gaps to reconfigure the UE 14 (i.e., to reconfigure hardware and/or software of the UE 14) to enable the UE 14 to perform measurements on the SCC of the configured and deactivated SCell 18 without interrupting, in this example, the PCell 16 (and any configured and activated SCells (not shown)).

In this disclosure, it is assumed that the UE 14 reports packet loss rate, and network nodes such as the eNB 12 may then make a decision on how to handle different UE implementations according to their packet loss capabilities.

In case the UE 14 reports packet losses which are not acceptable from a system perspective, the eNB 12 could, in principle, configure measurement gaps. In this case, the gap pattern is fully specified and known to the eNB 12 which can then avoid scheduling the UE 14 during measurement gaps, mitigate harmful impact of reconfiguration of the UE 14 for SCC measurements to, e.g., Outer Loop Link Adaptation (OLLA), and so on.

However, especially, because of the legacy behavior where it is not specified that the UE 14 shall use measurement gaps to measure SCC(s), simply configuring measurement gaps is not sufficient to ensure that there are no interruptions to the active carrier(s). Measurement gaps are used to measure inter-frequency carrier(s) on other frequencies and Radio Access Technologies (RATs) and it is not clear that UEs should use measurement gaps to avoid interruptions even when they are configured. As such, the present disclosure describes a new functionality in which measurement gaps are utilized to reconfigure the UE 14 for SCC measurements, thereby avoiding serving cell interruptions.

Figure 2:
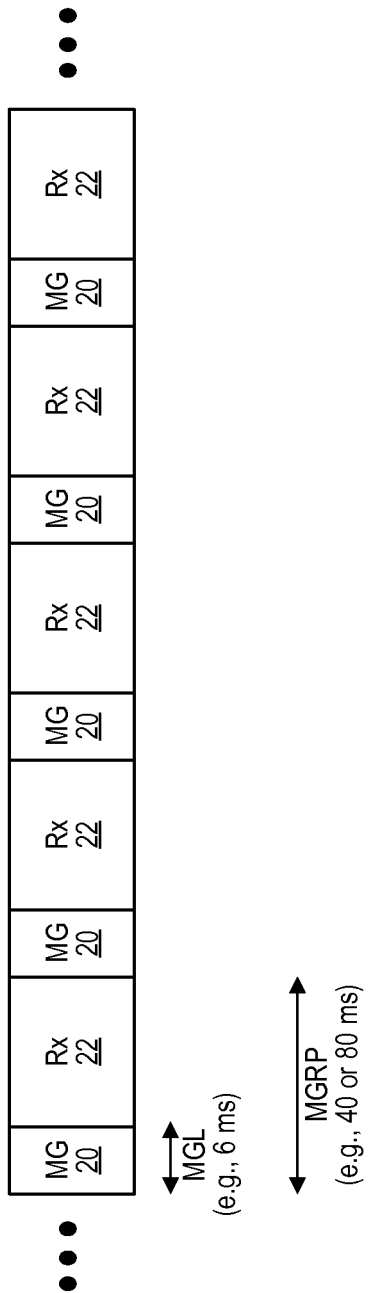
FIG. 2 illustrates a measurement gap pattern.

Currently, in the LTE specification, measurement gaps are specified to have a fixed Measurement Gap Length (MGL) of 6 milliseconds (ms), and can be configured to have a Measurement Gap Repetition Period (MGRP) of 40 ms or 80 ms. Different measurement gap durations or repetition periods could be introduced in future specifications without impacting the features disclosed in this document. FIG. 2 illustrates a measurement gap pattern. As illustrated, the measurement gap pattern includes measurement gaps 20. Reception (Rx) periods 22 are between the measurement gaps 20. The UE 14 receives the PCC and any configured and activated SCCs during the serving cell reception periods 22.

Figure 3:
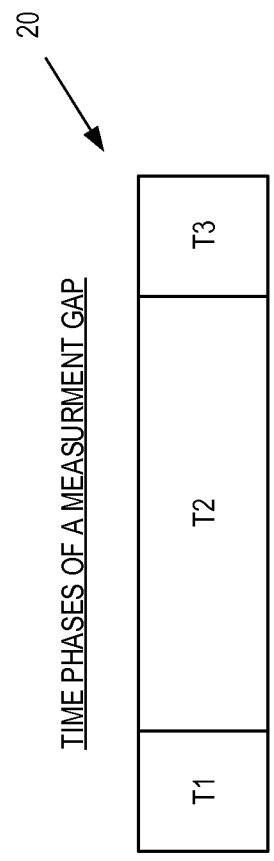
FIG. 3 illustrates time phases within a measurement gap pattern.

FIG. 3 illustrates an individual measurement gap 20 taken from the measurement gap pattern shown in FIG. 2. During the measurement gap 20, the UE 14 is not required to receive or transmit to the serving cell, which in FIG. 1 is the PCell 16. During time period T1, the UE 14 reconfigures to allow at least one of the receivers of the UE 14 to operate on a different frequency. For example, such reconfiguration may involve (but is not limited to):

Reprogramming synthesizers in a Radio Frequency (RF) circuit to receive a different carrier frequency;
Changing the receiver bandwidth;
Switching filtering or other components to receive from a different band;
Setting the gain of the RF to a level appropriate for receiving on the new frequency; and
Reconfiguring baseband hardware and/or software to a configuration suitable to performing operations on a different RAT (examples of RATs are Wideband Code Division Multiple Access (WCDMA), Global System for Mobile Communications (GSM), Code Division Multiple Access (CDMA) 2000, High Rate Packet Data (HRPD), IEEE 802.11, and Global Positioning System (GPS)).

During time period T2, the UE 14 performs the measurement operations on the target frequency. Measurement operations may include, but are not limited to:

Searching for unknown cells, e.g. to determine physical cell identity and timing, aka cell search;
Performing pilot signal measurements of known cells, aka identified cells, e.g. LTE Reference Signal Received Power (RSRP), LTE Reference Signal Received Quality (RSRQ), High Speed Packet Access (HSPA)/WCDMA Common Pilot Channel (CPICH) measurements, etc.;
Performing channel measurements of known cells, e.g. Time Division Synchronous CDMA (TD-SCDMA) Primary Common Control Physical Channel (PC-CPCH) Received Signal Code Power (RSCP);
Performing Receive Signal Strength Indicator (RSSI) measurements on the target frequency;
Identifying the Base Station Identity Code (BSIC) of a GSM cell;
Verifying the BSIC of a GSM cell; and
Performing Reference Signal Time Difference (RSTD) measurements of LTE cells for positioning purpose.

Conventionally, during time period T3, the UE 14 restores the receiver of the UE 14 to the original configuration to allow the UE 14 to receive the serving cell, which has been temporarily interrupted during the measurement gap. Such restoration may involve (but is not limited to):

Restoring synthesizers in a RF circuit to receive the original carrier frequency;
Restoring the original receiver bandwidth;
Switching filtering or other components to receive from the original band;
Restoring the gain of the RF to a setting equal to or derived from the gain setting before the measurement gap; and
Reconfiguring baseband hardware and/or software to a configuration suitable to performing operations on the original RAT (for example LTE).

The duration of time periods T1 and T3, and the resulting time available for measurements in time period T2, are a matter for UE implementation. However, in deriving performance requirements, 3GPP Radio Access Network Working Group 4 (RAN4) has previously assumed that T1=T3=0.5 ms.

Figure 4:
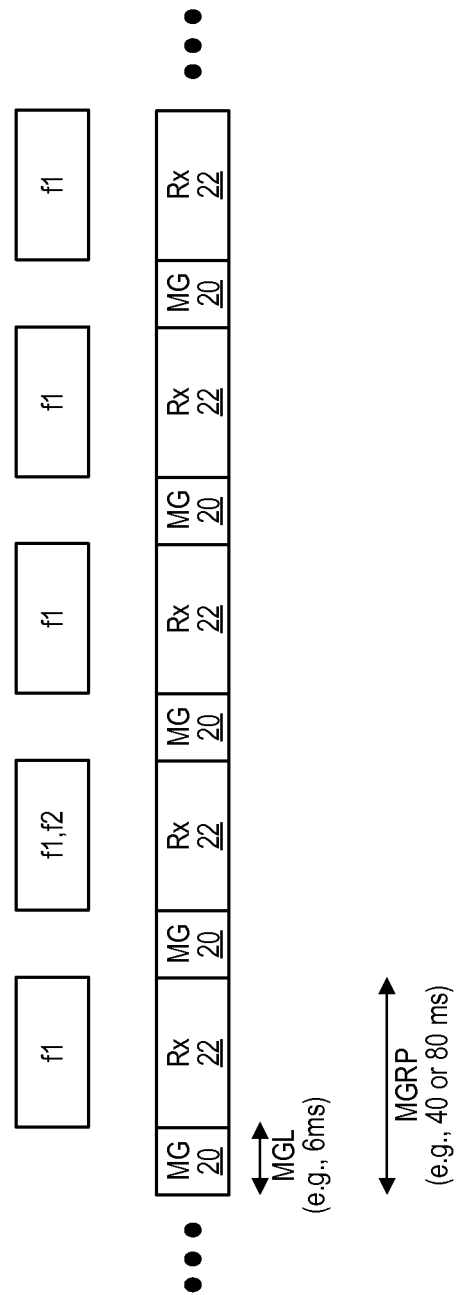
FIG. 4 graphically illustrates the use of a measurement gap to reconfigure a User Equipment device (UE) to receive a carrier(s) after the measurement gap that is different than a carrier(s) received before the measurement gap according to some embodiments of the present disclosure.

In contrast to the conventional use of measurement gaps described above where the UE 14 restores the original configuration by the end of the measurement gap 20, the CA capable UE 14 leaves the RF in a configuration suitable for receiving all the active serving cell(s) (i.e., the PCell 16 in the example of FIG. 1 and any configured and activated SCells (not shown in FIG. 1)) and additionally at least one deactivated SCC frequency (i.e., the SCC of the configured and deactivated SCell 18 in the example of FIG. 1). Suitable configuration here means both with respect to center frequency and bandwidth, and also with respect, e.g., to Analog to Digital Converter (ADC) sampling frequency adjustments to avoid interference due to spurs. The measurements on one or more cells (including the deactivated SCell 18) on the SCC with the deactivated SCell do not therefore need to be performed, or completely performed, within the measurement gap itself. A later measurement gap may then be used to restore the configuration where the UE 14 receives only the active serving cell(s), or may be used to change to a configuration suitable for receiving both the active serving cell(s) and at least one different deactivated SCC frequency. An example of this is illustrated in FIG. 4; after the second measurement gap 20 from the left of FIG. 4, the UE 14 has selected a configuration where carrier frequencies f1 and f2 may be received. So, if the primary cell (PCell 16) is on frequency f1 (aka PCC) and a deactivated SCell 18 is on frequency f2 (aka SCC), the UE 14 may perform measurements on frequency f2 during the reception period between the second and third measurement gaps 20 from the left in FIG. 4.

In case the UE 14 does not conduct measurements on deactivated SCell(s) in parallel with inter-RAT or inter-frequency measurements during the measurement gap 20, the UE 14 may de-configure support for spur interference mitigation for the duration of the measurement gap 20, and configure it again at the end, if needed, for the SCell measurement activities to be carried out until the next measurement gap, for example by adjusting the ADC sampling rate during the measurement gap. Spur interference mitigation can be performed by baseband filtering, and implies that the ADC needs to be operated at a higher than normal sampling rate to avoid aliasing of the spurious signal into the wanted bandwidth. By running the measurements in the gap using regular ADC sampling rates, particular UE designs can save power by having one less Phase-Locked Loop (PLL) running.

To summarize the forgoing, the aspects described above can be considered as making use of measurement gaps as opportunities to reconfigure UE operations such that the UE 14 is capable of receiving different carrier(s) after the measurement gap 20 than the ones it was receiving before the measurement gap 20.

Because the UE 14 is not required to perform measurements of secondary carriers (e.g., on the SCell 18 and/or neighbor cells on the SCC) with deactivated SCells during the measurement gaps 20 themselves, the measurement gaps 20 may still be used for other purposes, for example inter-frequency or inter-RAT measurements on a different frequency than the PCC or SCC(s). In case no other usage of the gap pattern is configured, the UE 14 is free to perform the reconfiguration of UE operations at any time during the measurement gap 20. In case the UE 14 is configured to perform measurements of inter-frequency or inter-RAT measurements on a different frequency than the PCC or SCC(s), then the UE 14 may perform these operations during the measurement gap 20 in the conventional manner, but then accordingly the UE 14 should reconfigure its operations such that the UE 14 is capable of receiving different carrier(s) after the measurement gap 20 than the ones it was receiving before the measurement gap 20 at the end of the measurement gap 20, i.e., time period T3 as illustrated in FIG. 2.

Because the UE 14 is still able to perform measurements on other carrier frequencies or RATs in the measurement gaps 20 and measurements of SCC(s) in other times than the measurement gaps 20, a scaling factor $N_{freq}$ used to specify the performance of inter-frequency and inter-RAT measurements when there are multiple carriers to be measured in gaps should not include any SCCs currently configured at the CA capable UE. The scaling factor, $N_{freq}$, corresponds to a number of inter-frequency and inter-RAT carriers configured at the UE for performing inter-frequency and inter-RAT measurements. The measurement delay (e.g., cell search delay, L1 measurement period, etc.) of the inter-frequency and inter-RAT measurements are typically extended by multiplying them with the scaling factor, $N_{freq}$. This is because the same measurement gaps are shared by the UE for measuring on all the configured inter-frequency and inter-RAT carriers.

The next aspect of the disclosure concerns the configuration of this measurement scheme. A legacy 3GPP LTE UE is expected to be capable of measuring SCCs when the SCell is deactivated without any measurement gaps, and potentially interrupts the serving cell to do so. Since any updates to define new functionality in the 3GPP specifications should be backwards compatible, this legacy behavior should not be redefined. The implication is that it should still be possible in future for UEs to measure without gaps. However, this raises the problem of how to configure UEs to follow the legacy behavior, or make use of measurement gaps to reconfigure for future measurements. Both the legacy behavior and the measurement gap reconfiguration have advantages, and in the LTE specifications measurement gaps do not have any explicitly signaled purpose.

Advantage of legacy behavior: No constraints on timing when the UE reconfigures to change the number of carriers it is receiving provided that packet loss rate meets minimum requirements. Power consumption may be reduced.

Advantage of new behavior: UE autonomous interruptions are guaranteed to be avoided, while still allowing the UE to reconfigure the number of carriers being received. The timing of measurement gaps is known to the serving network node(s) (e.g., eNB(s)).

Because both behaviors are advantageous in some circumstances, and because the legacy behavior should be maintained for backwards compatibility reasons, a configuration mechanism for the behavior should be specified. Several configuration mechanisms can be envisaged:

1) Explicit configuration of the new behavior by a network node (e.g., the eNB 12) using Radio Resource Control (RRC) signaling. For example, when the UE 14 is configured with measurement gaps and with at least one SCC with a deactivated SCell, then the network node may also configure the UE 14 as to whether the UE 14 should reconfigure its receiver for operation on SCC, e.g. for measuring on cells on SCC according to first UE behavior (the legacy behavior stated above) or second UE behavior (the new behavior stated above).
2) Implicit configuration of the new behavior whenever a measurement gap pattern is configured. Hence, when no gap pattern is configured, the legacy behavior is expected. But if gaps are configured, then the UE 14 shall follow the new UE behavior for reconfiguring its receiver for operation on SCC, e.g. for measuring on cells on SCC. In summary, the rule could be that if the UE 14 is configured with measurement gaps and with at least one SCC with a deactivated SCell, then the UE 14 shall not cause any interruption on the PCell and/or SCell(s) for doing radio operation on one or more cells of the deactivated SCC. Examples of radio operations are doing measurements. Such a rule can be pre-defined in the standard. The rule may also be applicable for certain configuration parameters related to CA, e.g. deactivated SCell measurement cycle (e.g., which causes interruption), number of configured SCCs, and type of CA (e.g., intra-band contiguous CA, intra-band non-contiguous CA, inter-band CA, or any combination thereof).

The UEs might not be capable of supporting operation according to the second UE behavior) (i.e., the new UE behavior to avoid interruptions using measurement gaps). In this case, a new UE capability signaling can be specified. This will enable the UE 14 to inform the network node (e.g., the eNB 12, a core network node such as a Mobility Management Entity (MME), a positioning node such as an Evolved Serving Mobile Location Centre (E-SMLC), etc.) that it is capable of the new UE behavior. In response, the network node can use this information for adapting the measurement configuration sent to the UE 14. For example, the UE 14 supporting this capability may also be configured with the measurement gaps when at least one configured SCC is deactivated or expected to be deactivated. On the other hand, for a UE not supporting the new UE behavior, the network node may even decide not to deactivate the SCell of the configured SCC; this will keep the UE from causing interruption on the PCell and/or SCell(s).

It is also possible that all UEs are not capable of switching between old and new UE behavior based on explicit configuration by the network node. In this case as well, new UE capability signaling can be specified. This will also enable the UE 14 to inform the network node (e.g., the eNB 12, a core network node such as a MME, a positioning node such as an E-SMLC, etc.) that it is capable of adapting between the old and the new UE behavior based on explicit configuration received from the network node. Then, based on such capability, the network node may decide whether to configure the UE 14 with the old or new UE behavior when the UE 14 is configured with at least one SCC.

Figure 5:
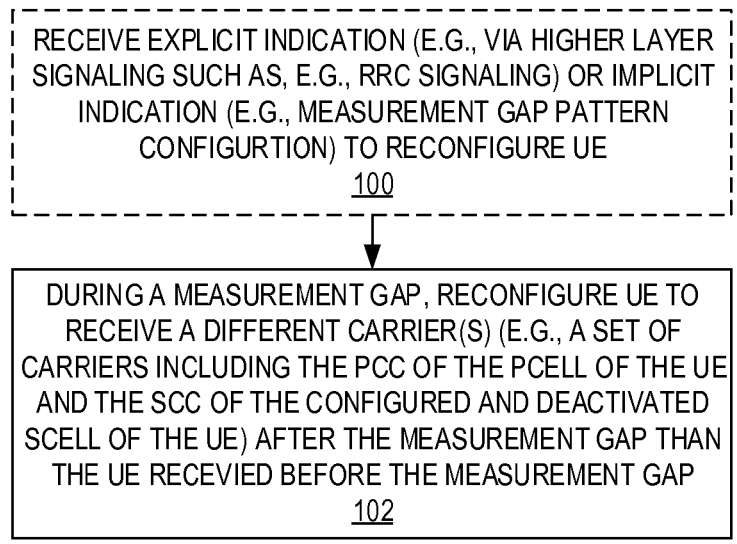
FIGS. 5 and 6 are flow charts that illustrate the operation of a UE according to some embodiments of the present disclosure.
Figure 6:
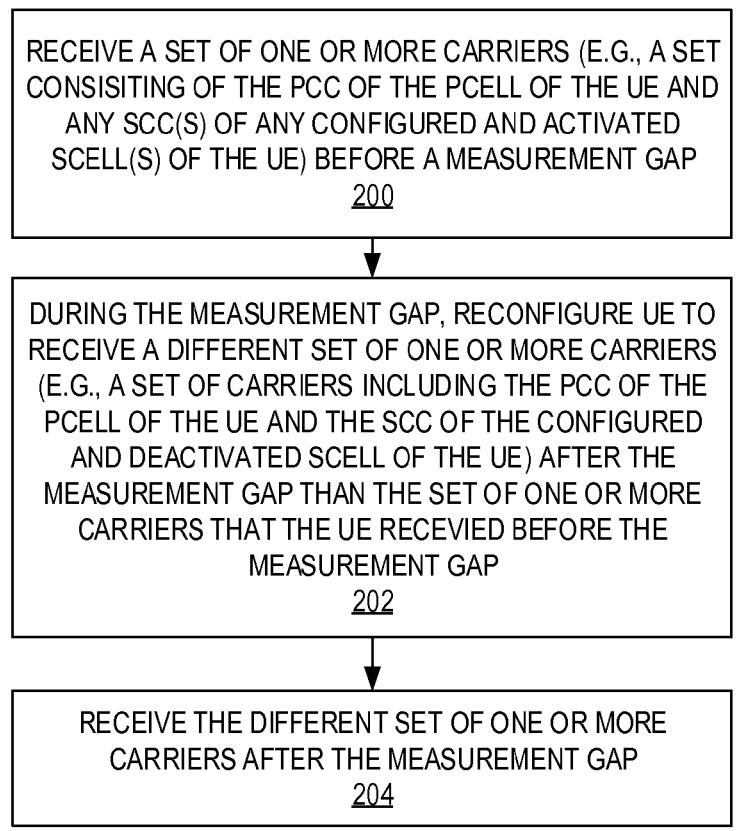

FIGS. 5 and 6 are flow charts that illustrate the operation of the UE 14 according to at least some of the embodiments described above. In particular, FIG. 5 is a flow chart that illustrates the operation of the UE 14 according to some embodiments of the present disclosure. Note that while processes are described herein as including "steps," as used herein, "steps" are not limited to being performed in any particular order unless otherwise explicitly stated or otherwise required. As illustrated, the UE 14 receives an explicit indication (e.g., via higher layer signaling such as, e.g., RRC signaling) or an implicit indication (e.g., measurement gap configuration when, e.g., the UE 14 has at least one configured and deactivated SCell 18) that the UE 14 is to utilize measurement gaps 20 for reconfiguration of the UE 14 (i.e., for reconfiguration of hardware and/or software of the UE 14) for measurements on the SCC(s) of the configured and deactivated SCell(s) 18 (step 100). In other words, the indication is that the UE 14 is to use measurement gaps 20 for reconfiguration of the UE 14 to receive (i.e., simultaneously receive) a set of carriers after the measurement gap 20 that is different than the set of carriers received by the UE before the measurement gap 20. Step 100 is optional, as indicated by the dashed box in FIG. 5, and, as such, is not required.

During a measurement gap 20, the UE 14 reconfigures itself to receive a different carrier(s) after the measurement gap 20 than the UE 14 received before the measurement gap 20 (step 102). For example, before the measurement gap 20, the UE 14 receives a set of one or more carriers including the PCC of the PCell 16 of the UE 14 and any SCC(s) of any configured and activated SCell(s) of the UE 14, but not the SCC of the configured and deactivated SCell 18 of the UE 14. During the measurement gap 20, the UE 14 reconfigures itself such that, after the measurement gap 20, the UE 14 receives a different set of one or more carriers including the SCC of the configured and deactivated SCell 18 of the UE 14, the PCC of the PCell 16 of the UE 14, and any SCC(s) of any configured and activated SCell(s) of the UE 14. Notably, as used herein, two sets A and B are different if set A is not equal to set B. Also, it should be noted that while the process of FIG. 5 is described with respect to configuring the UE 14 to perform measurements on the SCC of the configured and deactivated SCell 18 of the UE 14, the present disclosure is not limited thereto. This process can be used to reconfigure the UE 14 to receive a different carrier(s) after the measurement gap 20 than before the measurement gap 20 for any purpose.

FIG. 6 is a flow chart that illustrates the operation of the UE 14 according to some other embodiments of the present disclosure. FIG. 6 is similar to that of FIG. 5 but explicitly illustrates the reception of different sets of carriers before and after reconfiguration of the UE 14 during a measurement gap 20. As illustrated, the UE 14 receives a set of one or more carriers before a measurement gap 20 (step 200). During the measurement gap 20, the UE 14 reconfigures itself to receive a different set of one or more carriers after the measurement gap 20 (step 202). After the measurement gap 20, the UE 14 receives the different set of one or more carriers (step 204).

As an example, when starting measurements on the SCC of the configured and deactivated SCell 18 of the UE 14, the set of one or more carriers received by the UE 14 before the measurement gap 20 includes the PCC of the PCell 16 of the UE 14 and the SCC(s) of any configured and activated SCell(s) of the UE 14 but not the SCC of the configured and deactivated SCell 18 of the UE 14 (e.g., the set of one or more carriers before the measurement gap 20 consists of the PCC and the SCC(s) of any configured and activated SCell(s) of the UE 14), and the set of one or more carriers received by the UE 14 after the measurement gap 20 includes the PCC of the PCell 16 of the UE 14, the SCC(s) of any configured and activated SCell(s) of the UE 14, and the SCC of the configured and deactivated SCell 18 of the UE 14. Conversely, as another example, when ending measurements on the SCC of the configured and deactivated SCell 18 of the UE 14, the set of one or more carriers received by the UE 14 before the measurement gap 20 includes the PCC of the PCell 16 of the UE 14, the SCC(s) of any configured and activated SCell(s) of the UE 14, and the SCC of the configured and deactivated SCell 18 of the UE 14, and the set of one or more carriers received by the UE 14 after the measurement gap 20 includes the PCC of the PCell 16 of the UE 14 and the SCC(s) of any configured and activated SCell(s) of the UE 14 but not the SCC of the configured and deactivated SCell 18 of the UE 14. If there are additional configured and deactivated SCCs, the set of one or more carriers after the measurement gap 20 may also include the SCC of another configured and deactivated SCell of the UE 14.

The network node (e.g., the eNB 12) may configure the UE 14 explicitly or implicitly with the UE behavior (new or old UE behaviors) as described above. The network node may also receive and use the UE capability related to UE behavior.

According to yet another embodiment, the network node may also use one or more criteria to select a suitable gap pattern for avoiding interruptions on serving cell(s). For example, consider there are two or more different measurement gap patterns but one of these different measurement gap patterns needs to be selected and used for avoiding interruptions. Examples of gap patterns are: 1) each gap of 6 ms occurring with 40 ms periodicity (aka gap id#0), 2) each gap of 6 ms occurring with 80 ms periodicity (aka gap id#1), and 3) each gap of 6 ms occurring with 160 ms periodicity (aka gap id#2). Examples of criteria are described below:

1. SCell measurement cycle length: The network node may select the measurement gap pattern depending upon the length of the SCell measurement cycle configured for one or more SCells. For example, a longer gap pattern is used if the configured SCell measurement cycle is longer. As an example, if the SCell measurement cycle is 320 ms or longer, then the gap id#1 or even gap id#2 is used. If there are two or more configured SCells with different SCell measurement cycles, then the network node may select the pattern by considering the shortest configured SCell measurement cycle. For example, the network node may select gap id#0 or id#1 if one of the two SCell measurement cycles is 160 ms.

2. Depending on inter-frequency/inter-RAT measurements: If the UE 14 is also configured for performing inter-frequency and/or inter-RAT measurements using measurement gaps, then the network node may use the measurement gap pattern with shorter periodicity e.g. gap id#0. This is because in this case the measurement gaps are also used for doing such measurements in addition to being used to avoid interruption on serving cells due to RF reconfiguration. The performance of such measurements will be improved by using a gap pattern with shorter periodicity.

According to yet another embodiment, the network node may also adapt the SCell measurement cycle depending upon which measurement gap pattern is used for performing inter-frequency and/or inter-RAT measurements on one or more carriers or frequency layers. For example, certain types of measurements require a specific gap pattern, e.g. Observed Time Difference of Arrival (OTDOA) RSTD inter-frequency measurements can be done by the UE 14 if gap id#0 is configured. The measurement time (e.g., RSRP/RSRQ measurement period, cell identification delay, etc.) needed by the UE 14 for doing inter-frequency and/or inter-RAT measurements is also affected by the measurement gap pattern, e.g. longer measurement time with a measurement gap pattern with a longer periodicity.

As an example, if a measurement gap pattern with shorter periodicity (e.g., gap id#0) is currently used for performing inter-frequency and/or inter-RAT measurements, then the network node also selects and configures a relatively shorter SCell measurement cycle (e.g., 160 ms or 256 ms). But if a longer gap pattern is used (e.g., gap id#1 or id#2), then the network node may configure the UE with an SCell measurement cycle of moderate or longer periodicity (e.g., 320 ms or 640 ms).

Figure 7:
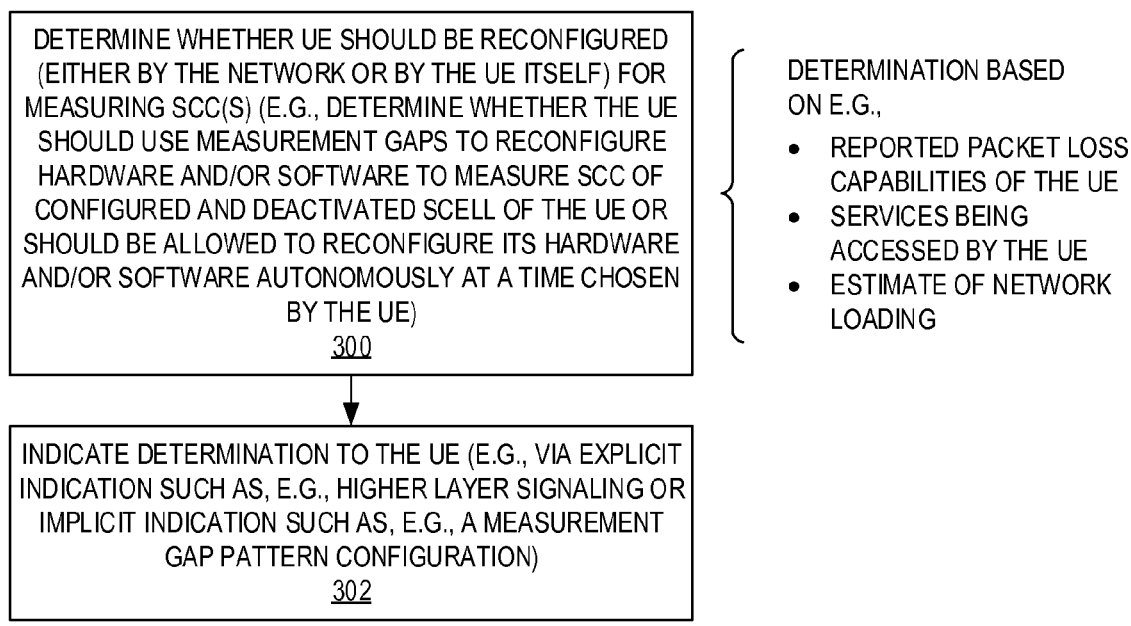
FIGS. 7 through 9 are flow charts that illustrate the operation of a network node according to some embodiments of the present disclosure.
Figure 8:
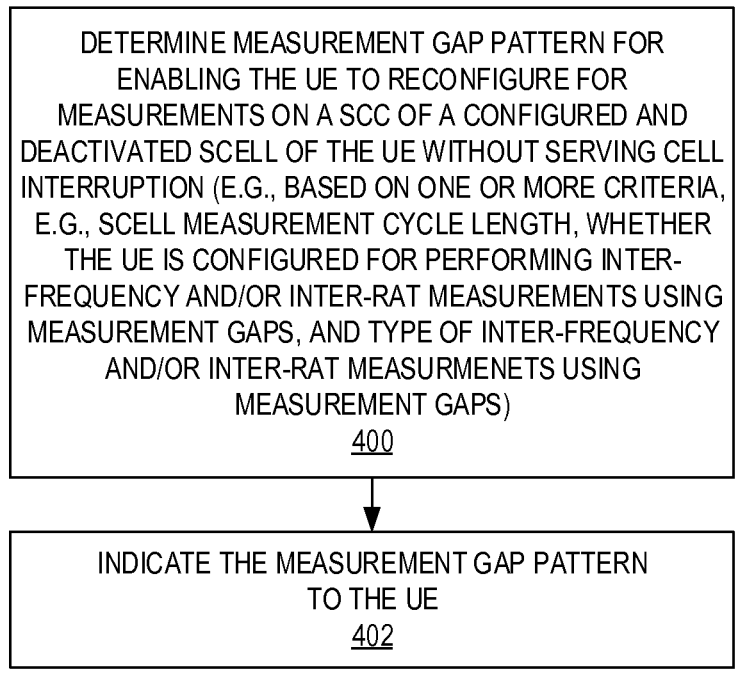
Figure 9:
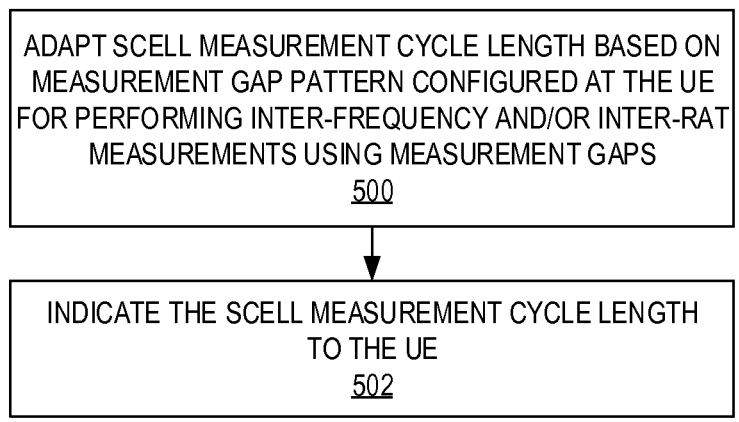

FIGS. 7 through 9 are flow charts illustrating the operation of a network node (e.g., the eNB 12) according to at least some of the embodiments described above. In particular, FIG. 7 illustrates the operation of a network node to determine whether the UE 14 should use measurement gaps for reconfiguration and providing a corresponding indication to the UE 14 according to some embodiments of the present disclosure. As illustrated, the network node first determines whether the UE 14 should be reconfigured for measuring SCC(s) of configured and deactivated SCell(s) using measurement gaps (step 300). Notably, while the network node makes this determination in this embodiment, the present disclosure is not limited thereto. In other embodiments, the UE 14 makes the determination. The determination of step 300 is, in other words, a determination as to whether the UE 14 is to use measurement gaps to reconfigure itself to measure on the SCC(s) of the configured and deactivated SCell(s) 18 of the UE 14 or should be allowed to reconfigure itself autonomously at a time chosen by the UE 14.

The determination of step 300 may be made based on or more criteria such as, e.g., reported packet loss capabilities of the UE 14, services being accessed by the UE 14, and/or an estimate of network loading. The packet loss capability may indicate whether or not the UE needs to drop serving cell packets while reconfiguring its radio receiver, e.g. for performing measurements on cells of other carriers, for activating or deactivating SCell(s), etc. The UE not dropping serving cell packets means that the UE does not cause any interruption on one or more serving cells (e.g., PCell, activated SCell(s), etc.) while reconfiguring its radio receiver. Examples of services are delay insensitive services such as best effort packet data, delay sensitive services Voice over Internet Protocol (VoIP), real time video, etc. For delay sensitive services like VoIP, the interruptions on serving cells should be avoided or minimized. Network loading can be expressed in terms of number of users per cell, percentage of radio resources being used per cell, usage of physical channels (e.g., Physical Downlink Control Channel (PDCCH), Physical Downlink Shared Channel (PDSCH), etc.). Under high network loading (e.g., if the number of users is above a threshold) the interruption is minimized or avoided. The reason is that under high load there may not be enough resources for retransmission of packets lost due to interruption.

The network node then indicates the determination to the UE 14 (step 302). As discussed above, this indication may be made via explicit signaling such as, for example, higher layering signaling (e.g., RRC signaling). Alternatively, this indication may be an implicit indication made by configuring a measurement gap pattern at the UE 14. The configuration of the measurement gap pattern or the combination of the configuration of the measurement gap pattern and one or more configured and deactivated SCells 18 may be interpreted by the UE 14 as an implicit indication that the UE 14 is to use measurement gaps for reconfiguration of the UE 14 for measurements on the SCC(s) of the configured and deactivated SCell(s) 18 of the UE 14.

FIG. 8 illustrates the operation a network node (e.g., the eNB 12) to determine the measurement gap pattern for the UE 14 (step 400). The measurement gap pattern determined, or selected, is to enable the UE 14 to reconfigure for measurements on the SCC(s) of the configured and deactivated SCell(s) 18 of the UE 14 without serving cell interruption. As discussed above, the determination of the measurement gap pattern may be based on one or more criteria such as, e.g., SCell measurement cycle length, whether the UE 14 is configured for performing inter-frequency (i.e., non-serving carrier) and/or inter-RAT measurements using measurement gaps, and/or the type of inter-frequency and/or inter-RAT measurements to be performed by the UE 14 using measurement gaps. Once the measurement gap pattern is determined, the network node indicates the measurement gap pattern to the UE 14 (step 402).

FIG. 9 is a flow chart that illustrates the operation of a network node (e.g., the eNB 12) to adapt the SCell measurement cycle length based on the measurement gap pattern configured at the UE 14 according to some embodiments of the present disclosure. As discussed above, the network node adapts or selects the measurement cycle for measurements on the SCC of the configured and deactivated SCell(s) 18 of the UE 14 based on a measurement gap pattern configured at the UE 14 for performing inter-frequency and/or inter-RAT measurements using measurement gaps (step 500). The measurement cycle is adapted such that it is consistent with the measurement gap pattern configured at the UE 14. In other words, by adapting the measurement cycle in this manner, the network node can ensure that the UE 14 is able to reconfigure itself for SCC measurements using measurement gaps (and therefore without interruptions). The network node indicates the SCell measurement cycle to the UE 14 (step 502).

FIGS. 10A and 10B illustrate the operation of the eNB 12 and the UE 14 of FIG. 1 according to at least some of the embodiments described above. Optional steps are indicated by dashed lines. In some embodiments, the UE 14 sends UE capability information to the eNB 12 (step 600). This capability information indicates, for example, whether the UE 14 is capable of using measurement gaps to reconfigure for SCC measurements and/or whether the UE 14 is capable of switching between using measurement gaps to reconfigure for SCC measurements and legacy behavior (i.e., autonomously performing SCC measurements at a time chosen by the UE 14).

The eNB 12 determines whether the UE 14 should use measurement gaps for reconfiguration for measurements on SCC(s) of configured and deactivated SCell(s) 18 of the UE 14, as discussed above (step 602). In this example, the eNB 12 determines that the UE 14 should use measurement gaps for SCC measurements; in some embodiments, the eNB 12 sends an explicit indication to the UE 14 (step 604). In addition, the eNB 12 sends a measurement gap configuration to the UE 14 (step 606). As discussed above, the measurement gap configuration may serve as an implicit indication to the UE 14 to use measurement gaps for measurements on SCC(s) for the configured and deactivated SCell(s) 18 of the UE 14. Further, as discussed above, the measurement gap pattern may be determined by the eNB 12 or some other network node based on various criteria, depending on the particular embodiment.

During a measurement gap, the UE 14 configures itself for simultaneous reception of a set of carriers including the PCC of the PCell 16 of the UE 14 and the SCC of the configured and deactivated SCell 18 of the UE 14 (step 608). If the measurement gap is also used for other purposes (e.g., inter-frequency and/or inter-RAT measurements), then the reconfiguration of the UE 14 for reception of the set of carriers is performed in time period T3 (see FIG. 3) of the measurement gap. However, if the measurement gap is not performed for any other purpose, then the reconfiguration of the UE 14 may be performed at any time during the measurement gap.

The UE 14 performs measurement(s) on the SCC of the configured and deactivated SCell 18 of the UE 14 at least partially after the measurement gap has ended (step 610). For instance, the UE 14 may begin measurement(s) as soon as the reconfiguration of step 608 is complete, which may still be within the measurement gap, and continue to perform the measurement(s) after the measurement gap has ended. As another example, the UE 14 may perform the measurement(s) after the measurement gap has ended (i.e., completely outside of the measurement gap). However, in either case, the measurement(s) are performed, at least partially, after the measurement gap has ended. The UE 14 may then report the measurement(s) to the eNB 12 (step 612).

Thereafter, during a sequent measurement gap (e.g., the immediately succeeding measurement gap or a later measurement gap), the UE 14 configures itself for either (a) reception of only the carrier(s) of the serving cell(s) of the UE 14 (e.g., the PCC of the PCell 16 of the UE 14 and any SCC(s) of any configured and activated SCell(s) of the UE 14) or (b) reception of a set of carriers including the carrier(s) of the serving cell(s) of the UE 14 and the SCC of another configured and deactivated SCell of the UE 14, if any (step 614). The process continues in this manner.

Figure 11:
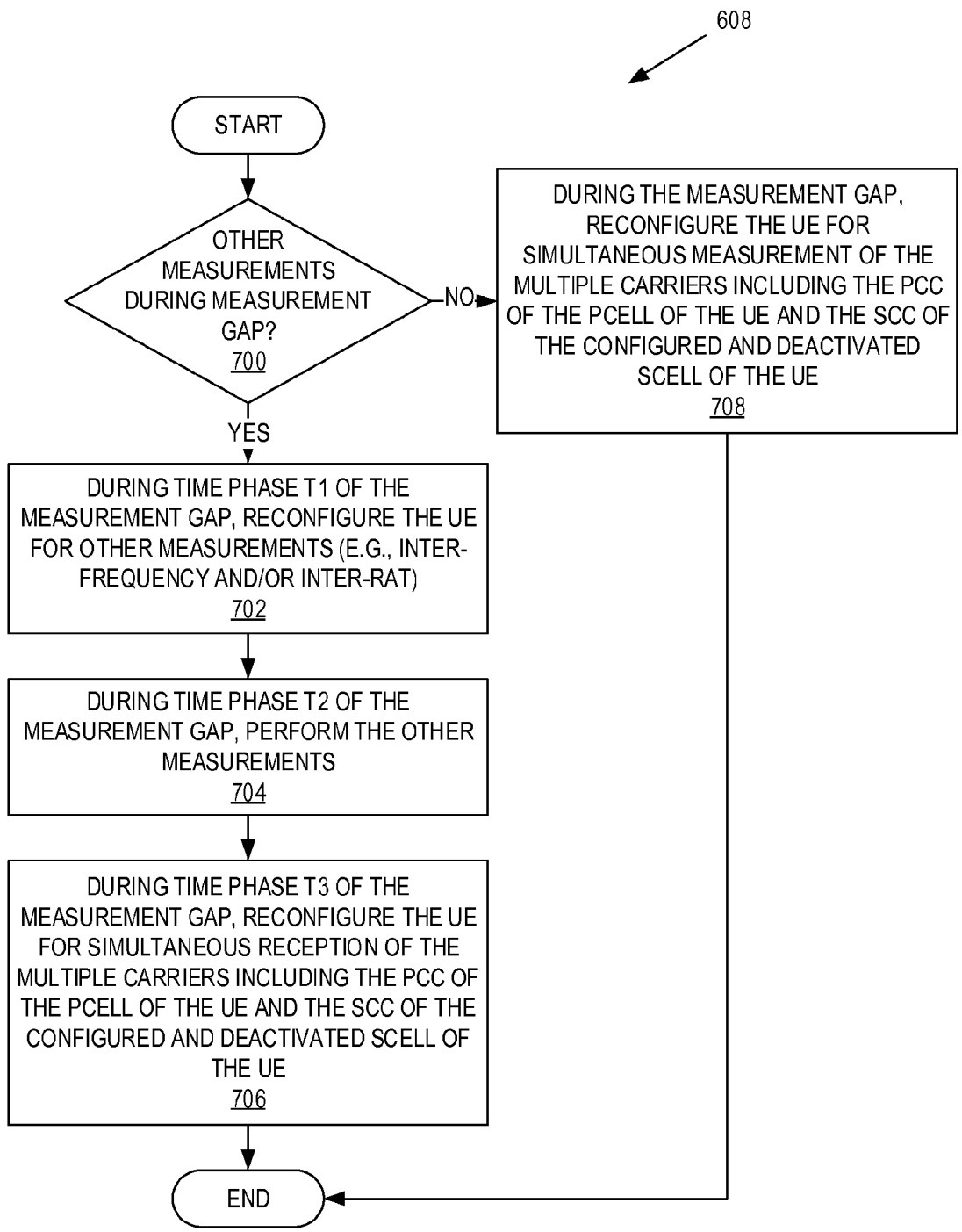
FIGS. 11 through 14 are flow charts that illustrate the operation of a UE according to some embodiments of the present disclosure.

FIG. 11 illustrates step 608 of FIG. 10A in more detail according to at least some of the embodiments described above. As illustrated, the UE 14 determines whether the measurement gap is to be used for other measurements (i.e., for other purposes) (step 700). If so, during time phase/period T1 of the measurement gap, the UE 14 reconfigures itself to perform other measurements (e.g., inter-frequency and/or inter-RAT measurements) (step 702). Then, during time phase/period T2, the UE 14 performs the other measurements (step 704). Then, during time phase/period T3 of the measurement gap, the UE 14 reconfigures itself for simultaneous reception of the set of carriers including the carrier(s) of the serving cell(s) of the UE 14 (e.g., the PCC of the PCell 16 of the UE 14 and the SCC(s) of any configured and activated SCell(s) of the UE 14) and the SCC of the configured and deactivated SCell 18 of the UE 14 (step 706). Returning to step 700, if the measurement gap is not to be used for other measurements, the UE 14 reconfigures itself for simultaneous reception of the set of carriers including the carrier(s) of the serving cell(s) of the UE 14 and the SCC of the configured and deactivated SCell 18 of the UE 14 at any time during the measurement gap (step 708).

Figure 12:
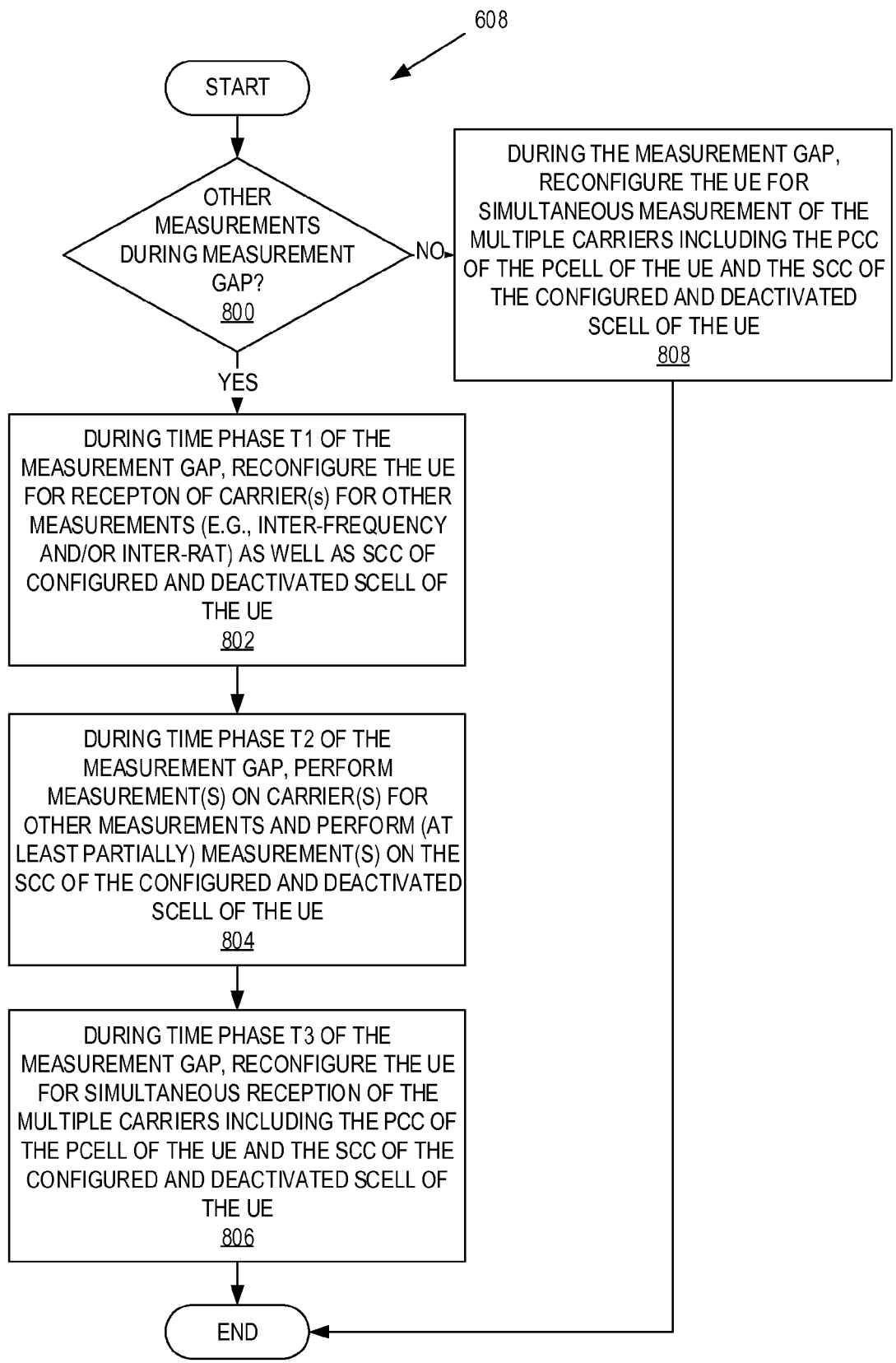

FIG. 12 illustrates step 608 of FIG. 10A in more detail according to some other embodiments of the present disclosure. This process is similar to that of FIG. 11 but where the UE 14 starts performing measurement(s) on the SCC of the configured and deactivated SCell 18 during time phase/period T2 of the measurement gap when inter-frequency and/or inter-RAT measurements are also being performed. More specifically, as illustrated, the UE 14 determines whether the measurement gap is to be used for other measurements (i.e., for other purposes) (step 800). If so, during time phase/period T1 of the measurement gap, the UE 14 reconfigures itself to simultaneously receive a carrier(s) for other measurements (e.g., the inter-frequency and/or inter-RAT measurement(s)) as well as the SCC of the configured and deactivated SCell 18 of the UE 14 (step 802). This is particularly beneficial where the carrier(s) for the other measurements and the SCC of the configured and deactivated SCell 18 of the UE 14 are adjacent in frequency. Then, during time phase/period T2, the UE 14 performs the other measurements and begins measurement(s) on the SCC of the configured and deactivated SCell 18 of the UE 14 (step 804). Then, during time phase/period T3 of the measurement gap, the UE 14 reconfigures itself for simultaneous reception of the set of carriers including the carrier(s) of the serving cell(s) of the UE 14 (e.g., the PCC of the PCell 16 of the UE 14 and the SCC(s) of any configured and activated SCell(s) of the UE 14) and the SCC of the configured and deactivated SCell 18 of the UE 14 (step 806). Returning to step 800, if the measurement gap is not to be used for other measurements, the UE 14 reconfigures itself for simultaneous reception of the set of carriers including the carrier(s) of the serving cell(s) of the UE 14 and the SCC of the configured and deactivated SCell 18 of the UE 14 at any time during the measurement gap (step 808). The UE 14 may, in some embodiments, then begin measurement(s) on the SCC of the configured and deactivated SCell 18 of the UE 14 during the measurement gap.

Figure 13:
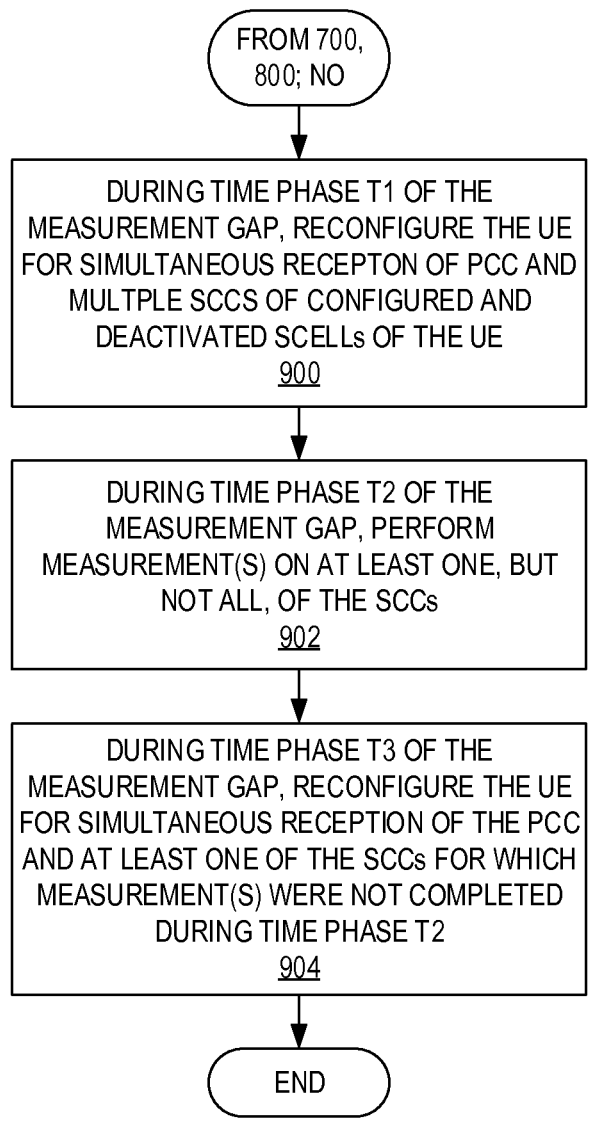

FIG. 13 illustrates processing after the NO branch of step 700 (FIG. 11) or 800 (FIG. 12) according to some embodiments of the present disclosure. In this embodiment, the UE 14 has multiple SCCs with configured and deactivated SCells 18. As illustrated, upon determining that other measurements (e.g., inter-frequency and/or inter-RAT measurement(s)) are not to be performed during the measurement gap, during time phase/period T1, the UE 14 reconfigures itself for simultaneous reception of the PCC of the PCell 16 of the UE 14 and the SCCs of multiple configured and deactivated SCells 18 of the UE 14 (step 900). Then, during time phase/period T2 of the measurement gap, the UE 14 performs a measurement(s) on at least one, but not all, of the SCCs (step 902). In particular, in this example, the UE 14 does not perform, or at least does not complete, measurement(s) on the SCC of the configured and deactivated SCell 18 of the UE 14, but has completed measurements on the other SCC(s) of the other configured and deactivated SCells. As such, during time phase/period T3, the UE 14 reconfigures itself for simultaneous reception of the set of carriers including the PCC, any SCC(s) of any configured and activated SCells, and the SCC of the configured and deactivated SCell 18 of the UE 14 (step 904).

Figure 14:
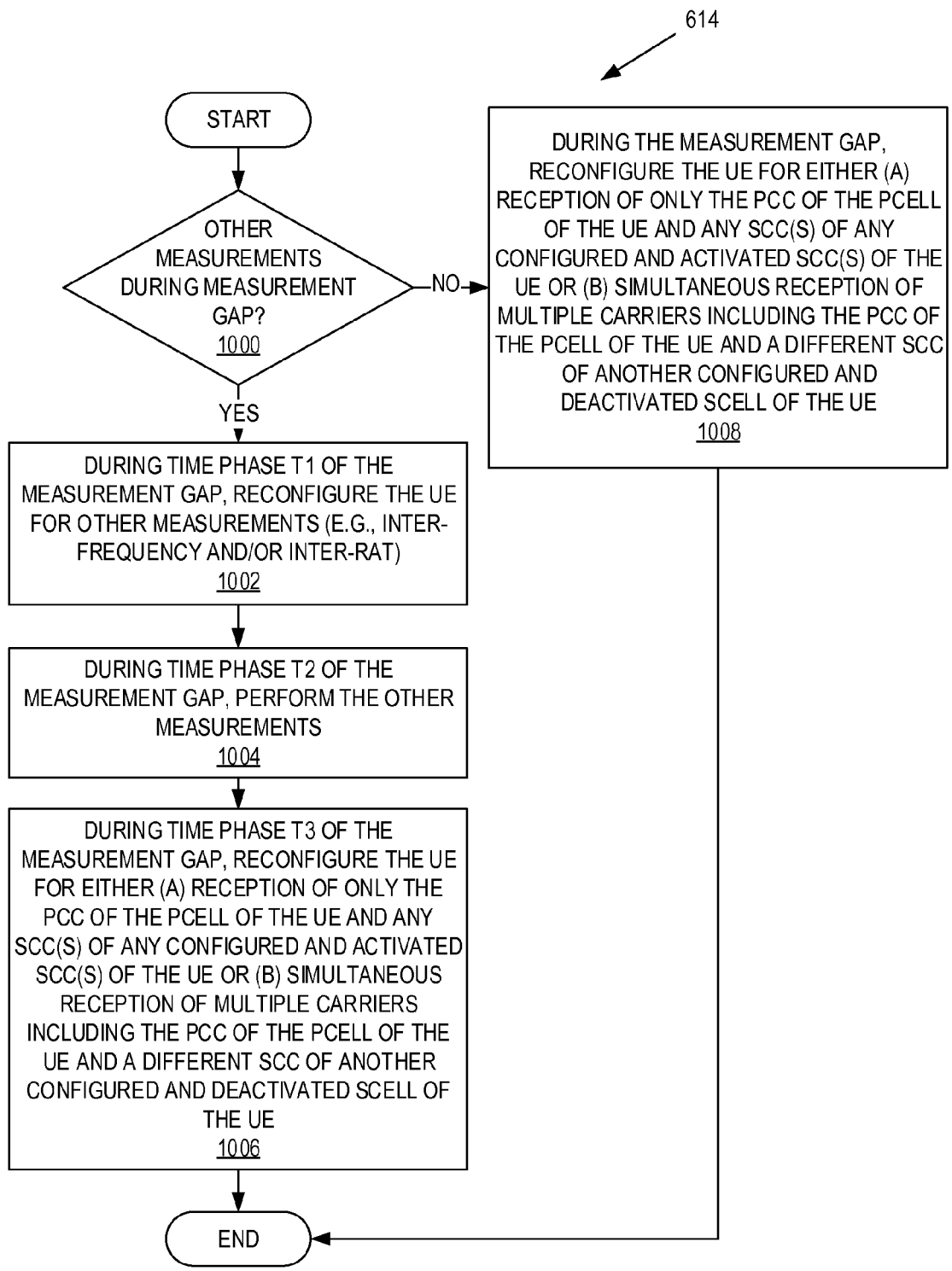

FIG. 14 illustrates step 614 of FIG. 10B in more detail according to at least some of the embodiments described above. This process is similar to that of FIG. 11 but is after measurements on the SCC of the configured and deactivated SCell 18 have been performed. As illustrated, the UE 14 determines whether the measurement gap is to be used for other measurements (i.e., for other purposes) (step 1000). If so, during time phase/period T1 of the measurement gap, the UE 14 reconfigures itself to perform other measurements (e.g., inter-frequency and/or inter-RAT measurements) (step 1002). Then, during time phase/period T2, the UE 14 performs the other measurements (step 1004). Then, during time phase/period T3 of the measurement gap, the UE 14 reconfigures itself for either (a) reception of the carrier(s) of the serving cell(s) of the UE 14 (e.g., the PCC of the PCell 16 of the UE 14 and the SCC(s) of any configured and activated SCell(s) of the UE 14) or (b) simultaneous reception of the set of carriers including the carrier(s) of the serving cell(s) of the UE 14 and the SCC of another configured and deactivated SCell 18 of the UE 14 (step 1006). The latter is beneficial where the UE 14 has multiple configured and deactivated SCells 18 on multiple SCCs. Returning to step 1000, if the measurement gap is not to be used for other measurements, the UE 14 reconfigures itself as described above with respect to step 1006 but at any time during the measurement gap (step 1008).

Figure 15:
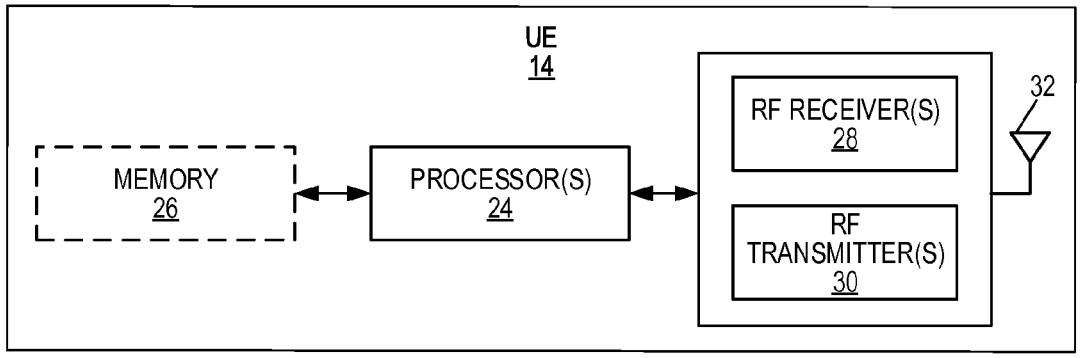
FIGS. 15 and 16 are block diagrams of a UE according to some embodiments of the present disclosure.

FIG. 15 is a block diagram of the UE 14 according to some embodiments of the present disclosure. As illustrated, the UE 14 includes one or more processors 24 (e.g., microprocessors, Central Processing Units (CPUs), Application Specific Integrated Circuits (ASICs), and/or Field Programmable Gate Arrays (FPGAs)) that may also be referred to herein as processing circuitry, memory 26, and RF circuitry including one or more RF receivers 28 and one or more RF transmitters 30 coupled to one or more antennas 32. In some embodiments, the functionality of the UE 14 described herein is implemented in software stored in the memory 26 and executed by the processor(s) 24.

In some embodiments, a computer program including instructions which, when executed by at least one processor, causes the at least one processor to carry out the functionality of the UE 14 according to any one of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as the memory 26).

Figure 16:
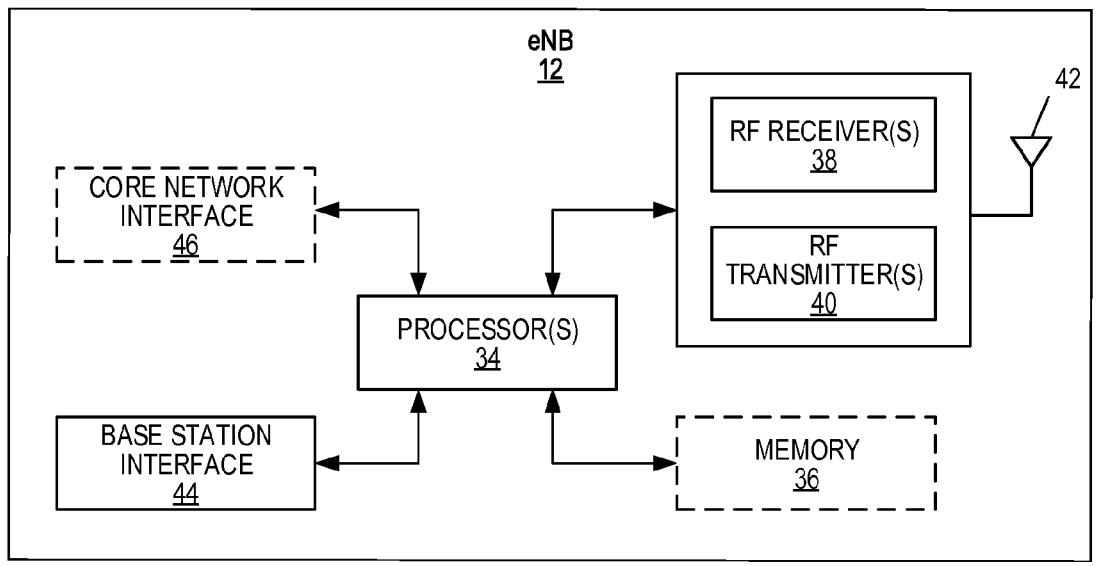

FIG. 16 is a block diagram of the eNB 12 according to some embodiments of the present disclosure. As illustrated, the eNB 12 includes one or more processors 34 (e.g., microprocessors, CPUs, ASICs, and/or FPGAs) that may also be referred to herein as processing circuitry, memory 36, and RF circuitry including one or more RF receivers 38 and one or more RF transmitters 40 coupled to one or more antennas 42. In addition, in some embodiments, the eNB 12 includes a base station interface 44 enabling base-station-to-base-station communication (e.g., an X2 interface) and a core network interface 46 enabling communication with a core network (e.g., an S1 interface). In some embodiments, the functionality of the eNB 12 described herein is implemented in software stored in the memory 36 and executed by the processor(s) 34. Notably, the eNB 12 is only one type of network node. Other network nodes will have similar architectures that may omit some of the components of FIG. 16 (e.g., a core network node such as an MME may not include the RF circuitry) and/or include additional components that are not illustrated in FIG. 16.

In some embodiments, a computer program including instructions which, when executed by at least one processor, causes the at least one processor to carry out the functionality of the eNB 12 according to any one of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as the memory 36).

Figure 17:
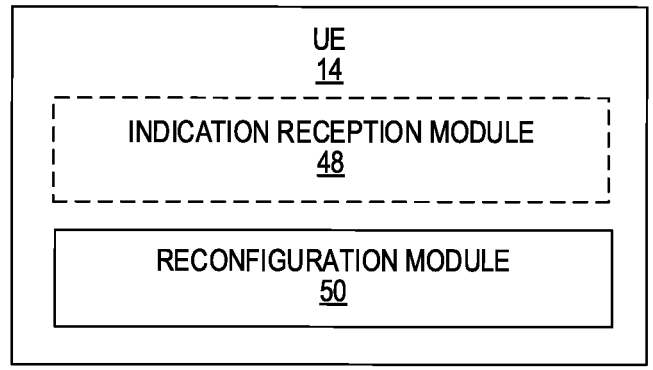
FIGS. 17 and 18 are block diagrams of a base station (e.g., an eNB) according to some embodiments of the present disclosure.

FIG. 17 is a block diagram of the UE 14 according to some other embodiments of the present disclosure. As illustrated, the UE 14 includes an indication reception module 48 and a reconfiguration module 50, both of which are implemented in software. In some embodiments, the indication reception module 48 operates to receive, via an associated receiver(s) of the UE 14 (not shown), an explicit or implicit indication of whether the UE 14 should use measurement gaps to reconfigure itself for measurements on SCCs of configured and deactivated SCell(s) 18 of the UE 14. The reconfiguration module 50 operates to reconfigure the UE 14 during measurement gaps according to any of the embodiments described herein.

Figure 18:
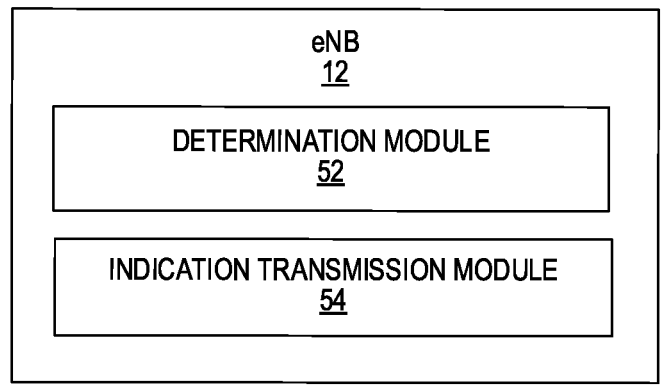

FIG. 18 is a block diagram of the eNB 12 according to some other embodiments of the present disclosure. As illustrated, the eNB 12 includes a determination module 52 and an indication transmission module 54, both of which are implemented in software. The determination module 52 operates to determine whether the UE 14 should use measurement gaps to reconfigure itself for measurements on SCCs of configured and deactivated SCell(s) 18 of the UE 14, as discussed above. The indication transmission module 54 operates to transmit, via an associated transmitter(s) of the eNB 12 (not shown), an explicit or implicit indication of the determination made by the determination module 52, as described above.

Some exemplary embodiments of the present disclosure will now be disclosed. These embodiments are examples and are not intended to limit the scope of the present disclosure.

In some aspects, measurement gaps are used as an opportunity to reconfigure the UE. The measurement of the deactivated SCC(s) is not restricted to occur during the measurement gaps themselves, which may additionally be used for another purpose, e.g. inter-frequency or inter-RAT measurements, or positioning (RSTD measurements for OTDOA). Conventionally, it is assumed that the measurement is performed during the measurement gap.

Other aspects deal with the configuration of a measurement gap based solution, since legacy behavior is that the UE will not use measurement gaps for SCC measurements and may make interruptions to active carriers according to specifications. Explicit or implicit signaling can be used. Explicit signaling is used (e.g., RRC signaling) by the network node to explicitly indicate that the UE should use a measurement gap pattern to avoid interruptions. Implicitly, when no gap pattern is configured, the UE follows the legacy behavior and when a gap pattern is configured a new behavior is defined. This can be realized by a pre-defined rule in the standard.

The UE capability signaling may also be defined. This definition is to enable the UE to inform the network node (e.g., an eNB) whether it is capable of adapting between legacy UE behavior and new UE behavior based on explicit indication from the network node and/or based on a pre-defined rule. Based on the received capability information, the network node may decide whether to configure measurement gaps or not at the UE configured with at least one SCC.

Certain advantages are readily apparent from the disclosure and claims. Among them are UE autonomous interruptions to the reception of active carriers while making measurements of SCC(s) with deactivated SCell(s) are avoided. Also, the measurement gaps are not used for the measurement of the SCC; hence, they may still be used for another purpose such as inter-frequency or inter-RAT measurements, or positioning.

In some embodiments, a method is provided where the UE reconfigures hardware and software during measurement gaps such that the UE is capable to receive different carrier(s) after a measurement gap to the ones it was receiving before the measurement gap.

In some embodiments, the hardware and software reconfiguration is used to start or stop measurements of one or more configured and deactivated SCCs.

In some embodiments, the reconfiguration of hardware and software during measurement gaps is performed by RRC signaling.

In some embodiments, the reconfiguration of hardware and software during measurement gaps is enabled whenever measurement gaps are configured.

In some embodiments, the reconfiguration of hardware and software during measurement gaps is enabled whenever measurement gaps are configured and one or more SCells is configured and deactivated.

In some embodiments, measurements of non-serving frequencies or RATs are performed during the measurement gaps.

In some embodiments, the performance of measurements on non-serving frequencies or RATs is not affected by hardware and software reconfiguration to receive different carrier(s) after a measurement gap to the ones it was receiving before the measurement gap.

Embodiments of a method of operation of a network node are also disclosed. In some embodiments, a method is provided where network node (an eNB) determines whether a given UE should use measurement gaps to reconfigure hardware and software to measure configured and deactivated SCCs, or should be allowed to reconfigure its hardware and software autonomously at a time chosen by the UE, and whereby this determination is indicated to the UE.

In some embodiments, the determination is made based on reported capabilities for packet loss received from the UE.

In some embodiments, the determination is made according to the services being accessed by the UE.

In some embodiments, the determination is made according to an estimate of network loading.

In some embodiments, the indication is transmitted to the UE by higher layer signaling.

In some embodiments, the indication is implied when the eNB configures a measurement gap pattern.

In some embodiments, the network node determines the measurement gap pattern for enabling the UE to reconfigure its RF to avoid serving cell interruption based on one or more criteria.

In some embodiments, the criteria are one or more of: SCell measurement cycle length, whether UE is configured for doing inter-frequency and/or inter-RAT measurements using measurement gaps, and type of inter-frequency and/or inter-RAT measurements using measurement gaps.

In some embodiments, the network node adapts the SCell measurement cycle length based on the measurement gap pattern configured at the UE for doing inter-frequency and/or inter-RAT measurements using measurement gaps.

The following acronyms are used throughout this disclosure.

3GPP Third Generation Partnership Project
ADC Analog to Digital Converter
ASIC Application Specific Integrated Circuits
BLER Block Error Rate
BSIC Base Station Identity Code
CA Carrier Aggregation
CC Component Carrier
CDMA Code Division Multiple Access
CPICH Common Pilot Channel
CPU Central Processing Unit
E-SMLC Evolved Serving Mobile Location Centre
eNB Enhanced or Evolved Node B
FPGA Field Programmable Gate Array
GPS Global Positioning System
GSM Global System for Mobile Communications
HRPD High Rate Packet Data
HSPA High Speed Packet Access
LTE Long Term Evolution
MGL Measurement Gap Length
MGRP Measurement Gap Repetition Period
MME Mobility Management Entity
ms Millisecond
OLLA Outer Loop Link Adaptation
OTDOA Observed Time Difference of Arrival
PCC Primary Component Carrier
PCCPCH Primary Common Control Physical Channel
PCell Primary Cell
PDCCH Physical Downlink Control Channel
PDSCH Physical Downlink Shared Channel
PLL Phase-Locked Loop
RAN4 Radio Access Network Working Group 4
RAT Radio Access Technology
RF Radio Frequency
RRC Radio Resource Control
RSCP Received Signal Code Power
RSRP Reference Signal Received Power
RSRQ Reference Signal Received Quality
RSSI Receive Signal Strength Indicator
RSTD Reference Signal Time Difference
Rx Reception
SCC Secondary Component Carrier
SCell Secondary Cell
TD-SCDMA Time Division Synchronous Code Division Multiple Access
UE User Equipment
VoIP Voice over Internet Protocol
WCDMA Wideband Code Division Multiple Access Those skilled in the art will recognize improvements and modifications to the embodiments of the present disclosure. All such improvements and modifications are considered within the scope of the concepts disclosed herein and the claims that follow.

What is claimed is:

1. A method of operation of a carrier aggregation enabled wireless device in a cellular communications network, comprising:
reconfiguring the wireless device during a measurement gap such that the wireless device is enabled to receive a first set of one or more carriers after the measurement gap, wherein the first set of one or more carriers are different than a second set of one or more carriers that the wireless device was receiving before the measurement gap, wherein:
the first set of one or more carriers comprises a Primary Component Carrier, PCC, of a Primary Cell, PCell, of the wireless device and a Secondary Component Carrier, SCC, of a configured and deactivated Secondary Cell, SCell, of the wireless device; and
the second set of one or more carriers comprises the PCC of the PCell of the wireless device but not the SCC of the configured and deactivated SCell of the wireless device; and
wherein reconfiguring the wireless device during the measurement gap further comprises:
reconfiguring the wireless device for simultaneous reception of one or more carriers for non-serving frequency and/or inter-Radio Access Technology, RAT, measurements and the SCC of the configured and deactivated SCell of the wireless device during a time phase T1 of the measurement gap;
performing one or more measurements on the one or more carriers for non-serving frequency and/or inter-RAT measurements during a time phase T2 of the measurement gap;
starting one or more measurements on the SCC of the configured and deactivated SCell of the wireless device during the time phase T2 of the measurement gap; and
reconfiguring the wireless device for simultaneous reception of the first set of one or more carriers during a time phase T3 of the measurement gap, wherein the first set of one or more carriers does not comprise the one or more carriers for non-serving frequency and/or inter-RAT measurements.

2. The method of claim 1 further comprising:
receiving the second set of one or more carriers before the measurement gap; and
receiving the first set of one or more carriers after the measurement gap.

3. The method of claim 1 further comprising:
receiving an indication from the cellular communications network that the wireless device is to use measurement gaps for reconfiguration of the wireless device to receive different sets of carriers after the measurement gaps than the wireless device was receiving before the measurement gaps.

4. The method of claim 3 wherein the indication is an explicit indication received via radio resource control signaling.

5. The method of claim 3 wherein the indication is an implicit indication when measurement gaps are configured at the wireless device.

6. The method of claim 3 wherein the indication is an implicit indication when measurement gaps are configured at the wireless device and the wireless device has at least one configured and deactivated Secondary Cell, SCell, on a respective Secondary Component Carrier, SCC.

7. The method of claim 1 further comprising:
performing non-serving frequency and/or inter-Radio Access Technology, RAT, measurements during the measurement gap.

8. The method of claim 1 wherein reconfiguring the wireless device during the measurement gap comprises, if no non-serving frequency or inter-Radio Access Technology, RAT, measurements are to be performed during the measurement gap:
reconfiguring the wireless device at any time during the measurement gap.

9. The method of claim 1, further comprising not causing interruption on any serving cell when reconfiguring a radio frequency receiver of the wireless device provided the measurement gaps are configured.

10. The method of claim 1, further comprising:
signaling wireless device capability information to a network node, said capability information indicating that the wireless device is capable of reconfiguring the wireless device during a measurement gap such that the wireless device is enabled to receive a set of one or more carriers after the measurement gap that is different than that which the wireless device was receiving before the measurement gap.

11. A method of operation of a carrier aggregation enabled wireless device in a cellular communications network, comprising:
reconfiguring the wireless device during a measurement gap such that the wireless device is enabled to receive a first set of one or more carriers after the measurement gap, wherein the first set of one or more carriers are different than a second set of one or more carriers that the wireless device was receiving before the measurement gap,
wherein:
the first set of one or more carriers comprises a Primary Component Carrier, PCC, of a Primary Cell, PCell, of the wireless device and a Secondary Component Carrier, SCC, of a configured and deactivated Secondary Cell, SCell, of the wireless device; and
the second set of one or more carriers comprises the PCC of the PCell of the wireless device but not the SCC of the configured and deactivated SCell of the wireless device; and wherein reconfiguring the wireless device during the measurement gap further comprises:
reconfiguring the wireless device for simultaneous reception of the PCC, the SCC of the configured and deactivated SCell of the wireless device, and an additional SCC of an additional configured and deactivated SCell of the wireless device during a time phase T1 of the measurement gap;
performing one or more measurements on the additional SCC during a time phase T2 of the measurement gap; and
reconfiguring the wireless device for simultaneous reception of the first set of one or more carriers during a time phase T3 of the measurement gap.

12. A carrier aggregation enabled wireless device for operation in a cellular communications network, comprising:
a radio frequency receiver front-end comprising one or more receivers;
one or more processors; and
memory containing instructions executable by the one or more processors whereby the wireless device is configured to:
reconfigure the wireless device during a measurement gap such that the wireless device is, via the radio frequency receiver front end, enabled to receive a first set of one or more carriers after the measurement gap, wherein the first set of one or more carriers are different than a second set of one or more carriers that the wireless device was receiving before the measurement gap,
wherein:
the first set of one or more carriers comprises a Primary Component Carrier, PCC, of a Primary Cell, PCell, of the wireless device and a Secondary Component Carrier, SCC, of a configured and deactivated Secondary Cell, SCell, of the wireless device; and the second set of one or more carriers comprises the PCC of the PCell of the wireless device but not the SCC of the configured and deactivated SCell of the wireless device; and wherein the wireless device, via execution of the instructions by the one or more processors, is further configured to reconfigure the wireless device during the measurement gap by being configured to:

reconfigure the wireless device for simultaneous reception of one or more carriers for non-serving frequency and/or inter-Radio Access Technology, RAT, measurements and the SCC of the configured and deactivated SCell of the wireless device during a time phase T1 of the measurement gap;

perform one or more measurements on the one or more carriers for non-serving frequency and/or inter-RAT measurements during a time phase T2 of the measurement gap;

start one or more measurements on the SCC of the configured and deactivated SCell of the wireless device during the time phase T2 of the measurement gap; and reconfigure the wireless device for simultaneous reception of the first set of one or more carriers during a time phase T3 of the measurement gap, wherein the first set of one or more carriers does not comprise the one or more carriers for non-serving frequency and/or inter-RAT measurements.

13. The carrier aggregation enabled wireless device of claim 12 wherein, via execution of the instructions by the one or more processors, the wireless device is further configured to: receive the second set of one or more carriers before the measurement gap; and receive the first set of one or more carriers after the measurement gap.

14. The carrier aggregation enabled wireless device of claim 12 wherein, via execution of the instructions by the one or more processors, the wireless device is further configured to: receive an indication from the cellular communications network that the wireless device is to use measurement gaps for reconfiguration of the wireless device to receive different sets of carriers after the measurement gaps than the wireless device was receiving before the measurement gaps.

15. A carrier aggregation enabled wireless device for operation in a cellular communications network, comprising:

a radio frequency receiver front-end comprising one or more receivers;

one or more processors; and memory containing instructions executable by the one or more processors whereby the wireless device is configured to:

reconfigure the wireless device during a measurement gap such that the wireless device is enabled to receive a first set of one or more carriers after the measurement gap, wherein the first set of one or more carriers are different than a second set of one or more carriers that the wireless device was receiving before the measurement gap, wherein:

the first set of one or more carriers comprises a Primary Component Carrier, PCC, of a Primary Cell, PCell, of the wireless device and a Secondary Component Carrier, SCC, of a configured and deactivated Secondary Cell, SCell, of the wireless device; and the second set of one or more carriers comprises the PCC of the PCell of the wireless device but not the SCC of the configured and deactivated SCell of the wireless device; and wherein the wireless device, via execution of the instructions by the one or more processors, is further configured to reconfigure the wireless device during the measurement gap by being configured to:

reconfigure the wireless device for simultaneous reception of the PCC, the SCC of the configured and deactivated SCell of the wireless device, and an additional SCC of an additional configured and deactivated SCell of the wireless device during a time phase TI of the measurement gap;

perform one or more measurements on the additional SCC during a time phase T2 of the measurement gap; and reconfigure the wireless device for simultaneous reception of the first set of one or more carriers during a time phase T3 of the measurement gap.

* * * * *